March 26, 1957 M. T. GOETZ 2,786,567
CONTROL UNIT FOR COMPOSING MACHINES
Filed July 9, 1953 11 Sheets-Sheet 1

INVENTOR
MAURUS T. GOETZ
BY Emery Robinson
ATTORNEY

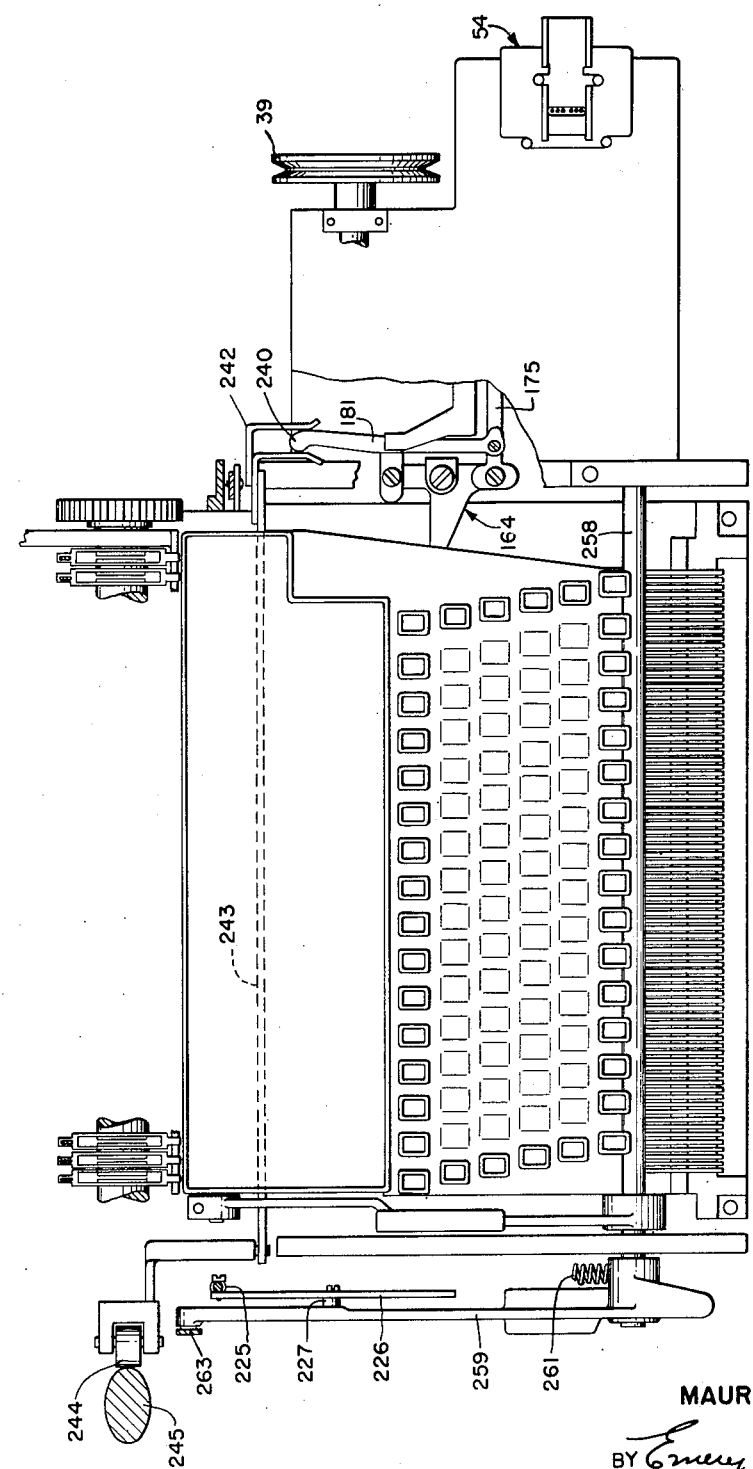

March 26, 1957     M. T. GOETZ     2,786,567
CONTROL UNIT FOR COMPOSING MACHINES
Filed July 9, 1953     11 Sheets-Sheet 3
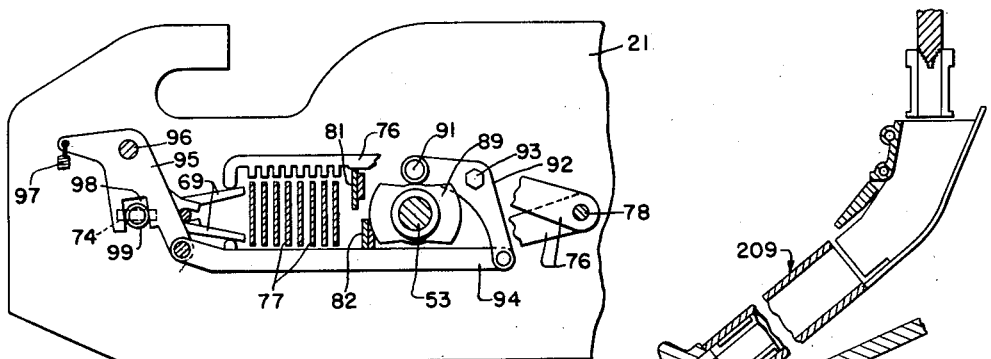
FIG. 4
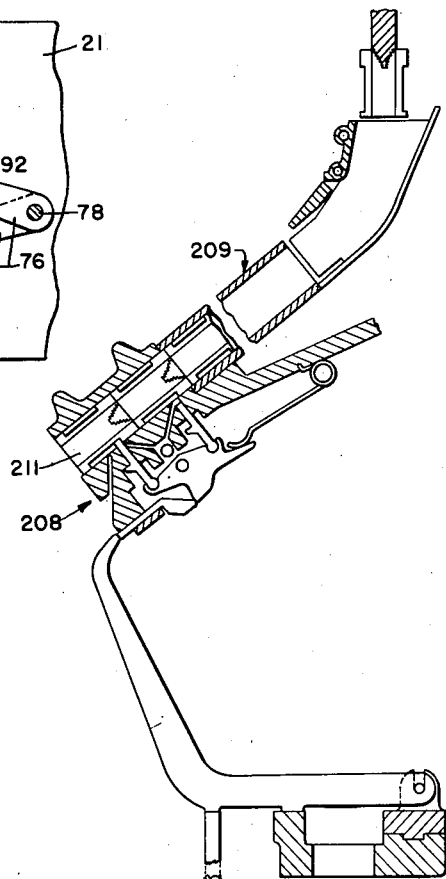
FIG. 3
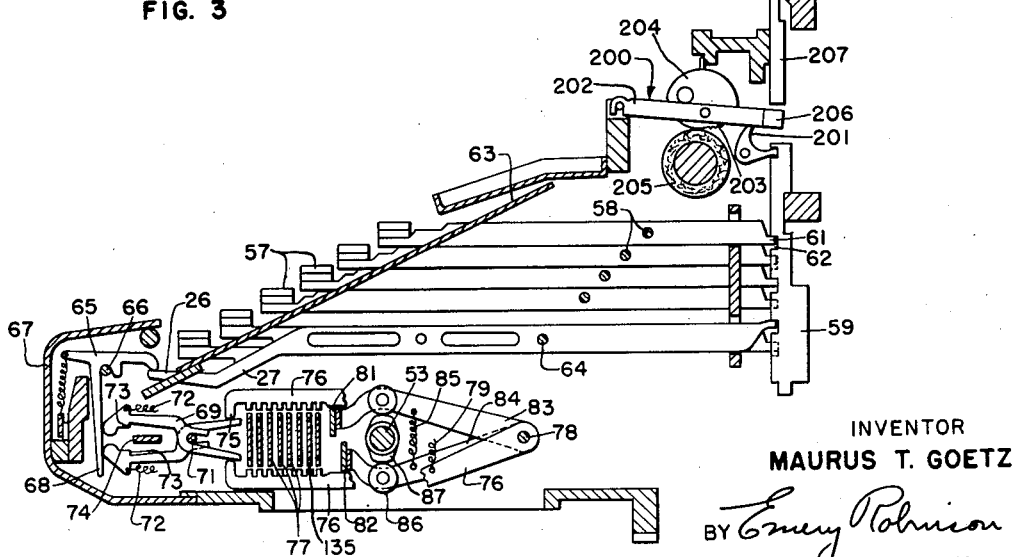
INVENTOR
MAURUS T. GOETZ
BY Emery Robinson
ATTORNEY March 26, 1957  M. T. GOETZ  2,786,567
CONTROL UNIT FOR COMPOSING MACHINES
Filed July 9, 1953  11 Sheets-Sheet 4

INVENTOR
MAURUS T. GOETZ
BY Emery Rolmion
ATTORNEY

March 26, 1957  M. T. GOETZ  2,786,567
CONTROL UNIT FOR COMPOSING MACHINES
Filed July 9, 1953  11 Sheets-Sheet 5
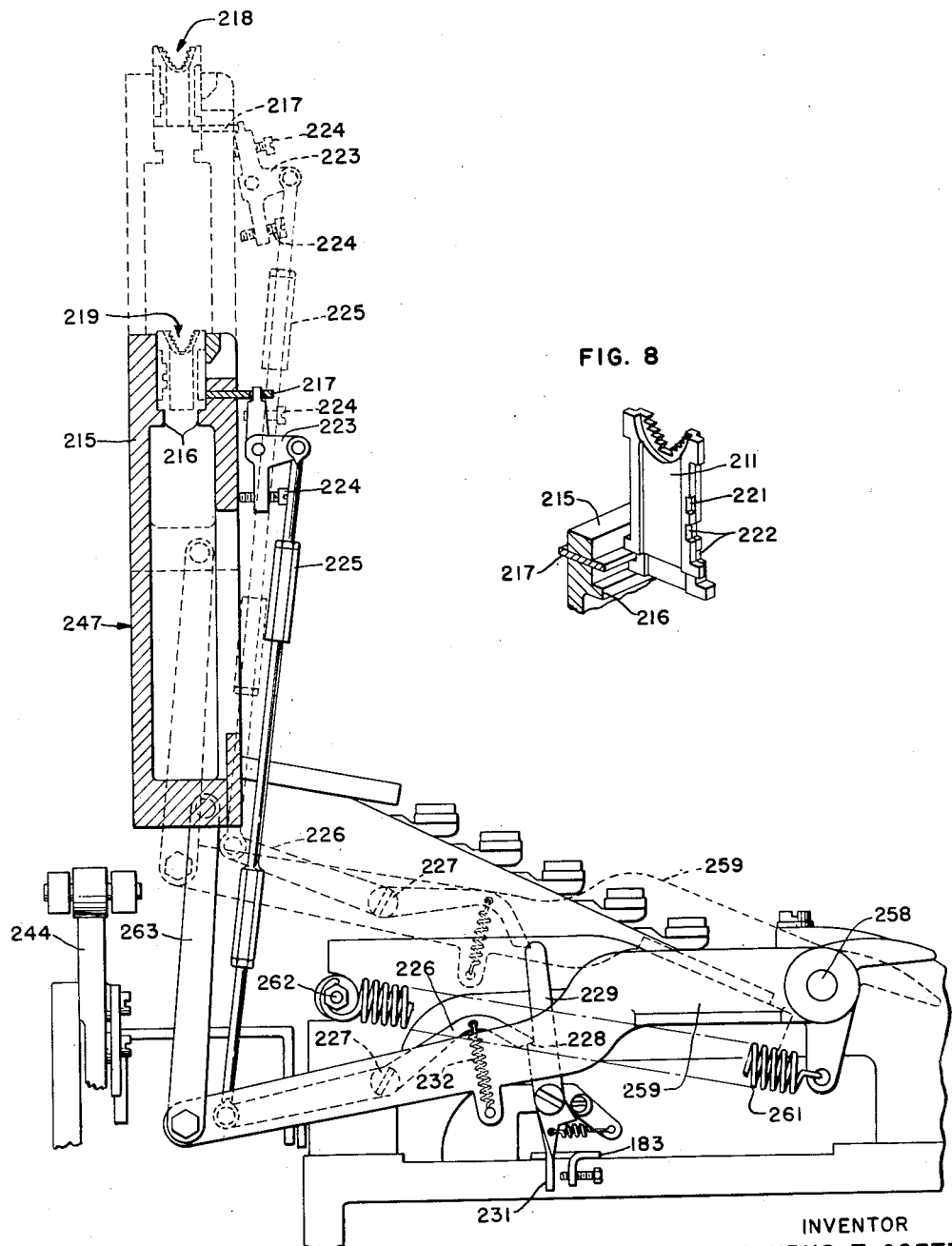
INVENTOR
MAURUS T. GOETZ
BY Emery Robinson
ATTORNEY March 26, 1957 M. T. GOETZ 2,786,567
CONTROL UNIT FOR COMPOSING MACHINES
Filed July 9, 1953 11 Sheets-Sheet 6

INVENTOR
MAURUS T. GOETZ
BY Emery Robinson
ATTORNEY

March 26, 1957    M. T. GOETZ    2,786,567
CONTROL UNIT FOR COMPOSING MACHINES
Filed July 9, 1953    11 Sheets-Sheet 7

INVENTOR
MAURUS T. GOETZ
BY Emery Robinson
ATTORNEY

March 26, 1957 M. T. GOETZ 2,786,567
CONTROL UNIT FOR COMPOSING MACHINES
Filed July 9, 1953 11 Sheets-Sheet 9
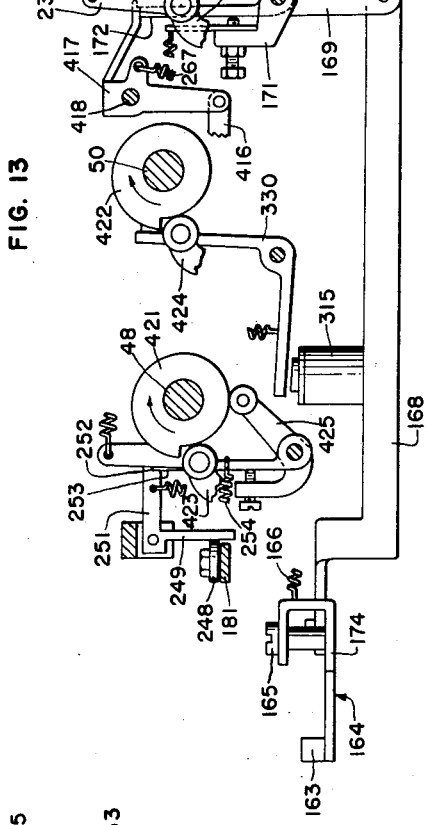
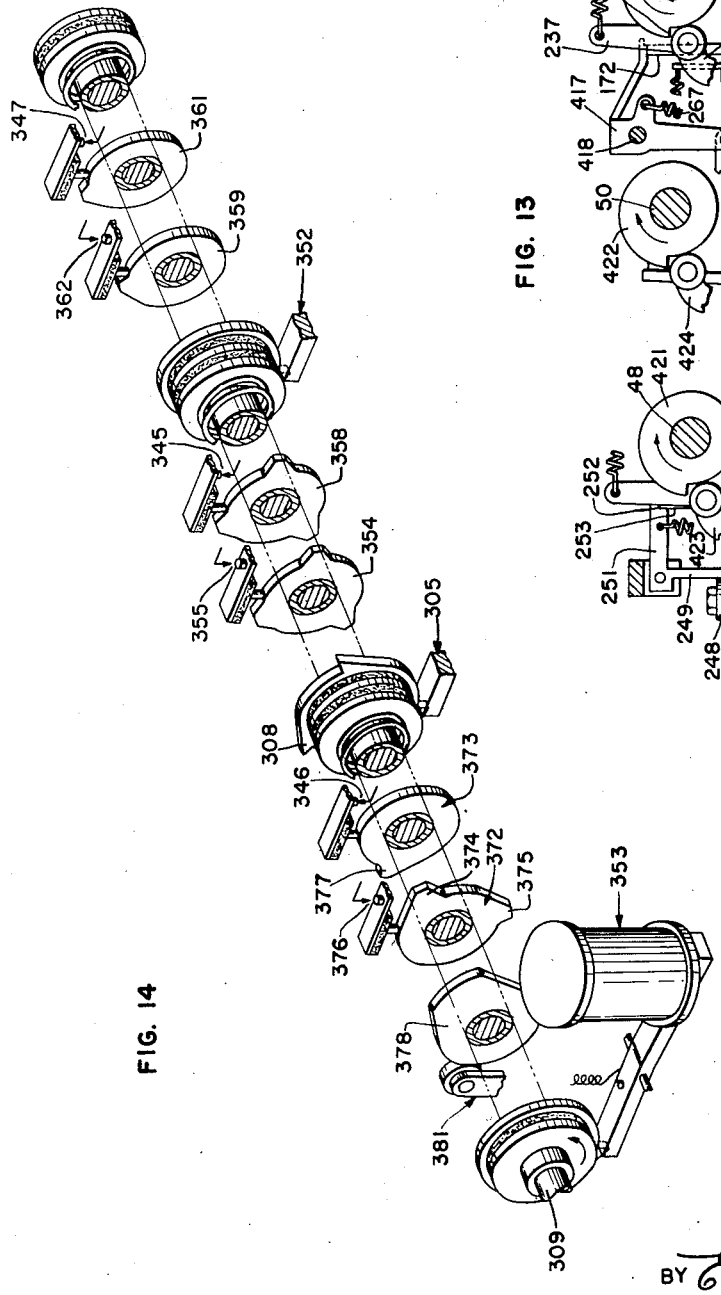
INVENTOR
MAURUS T. GOETZ
ATTORNEY March 26, 1957     M. T. GOETZ     2,786,567
CONTROL UNIT FOR COMPOSING MACHINES
Filed July 9, 1953     11 Sheets-Sheet 10

INVENTOR
MAURUS T. GOETZ
BY Emery Robinson
ATTORNEY

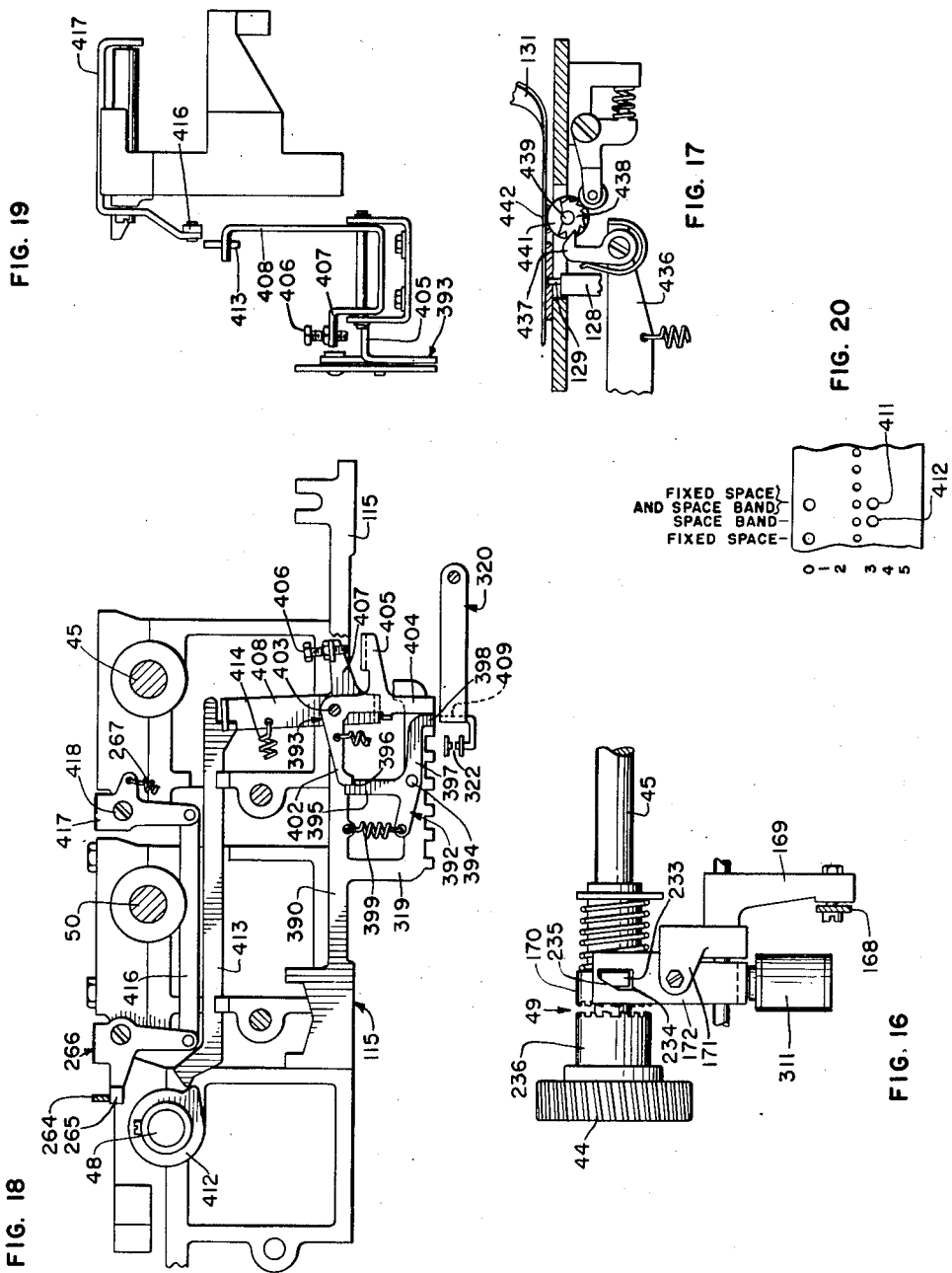

United States Patent Office

2,786,567
Patented Mar. 26, 1957

2,786,567

CONTROL UNIT FOR COMPOSING MACHINES

Maurus T. Goetz, Chicago, Ill., assignor, by mesne assignments, to Teletypesetter Corporation, Chicago, Ill., a corporation of Delaware Application July 9, 1953, Serial No. 366,912

16 Claims. (Cl. 199—18)

This invention pertains to improvements in line casting and composing machines and more particularly to automatic control mechanisms therefor.

Automatic control mechanisms are known that may be applied to standard types of line casting machines without changing the manual operating features thereof and retaining the characteristic features peculiar to these machines. Also, the control mechanism according to the present invention may be applied to a principal machine, such as the present existing line casting machines, without materially altering said machines.

The present invention has for its primary object to provide in an automatic control mechanism, features which will permit operation at higher speeds.

Another object of the invention is to provide an automatic control mechanism or unit operable on a two-cycle basis to increase the time available at any given speed to perform certain functions.

Specifically, the unit is controlled by a perforated tape or control form which may be prepared by the operation of a machine such as disclosed in United States Patent No. 2,059,250, granted November 3, 1936, to H. L. Krum, and which is fed through a record reading device wherein there is provided a plurality of feeler members, each one of which corresponds to a position in the tape that may or may not be provided with a perforation depending upon the particular code combination that is being read or sensed. Upon each momentary arrest of the control form, the several feelers sense the code combination perforated in the particular position and upon the next movement the combination is transferred to an intermediate set of storage devices following which a set of code bars are also positioned in accordance with such combination. The code bars are provided with notches on both top and bottom edges thereof and in this manner they accommodate a double alignment of selectable elements. In the preferred practice of the present invention the selectable elements are alternately and oppositely disposed with respect to each other in scissors-like fashion constituting two rows which are movable toward each other when urged into selected position. For each permutation of the code bars one and only one of these selectable elements may be placed into selected position and when any particular one is thus selected it actuates an associated interponent member to a position between an intermittently operated striker bar and a corresponding one of a plurality of keylever actuators. With the structure according to the present invention the interponents are actuated by the selectable elements into the path of the striker bar which then seizes control of the interponents to permit the selectable elements to respond to the succeeding selection thus providing an overlap. The motion of the common striker element is imparted through a keylever actuator to the particular keylever as a sharp staccato blow simulating the "touch" of the operator's finger when it is manually operated. A cam shaft which is constantly rotated during the normal operation of the reading device serves to reset the selectable elements and also to actuate the common striker bar and is timed with respect to the operative cycle to perform two complete selective functions for each revolution. In addition, the unit according to the present invention is designed with two separate operating cycles whereby the time available at any given speed to perform certain functions is increased over the time which is available for the same function in one-cycle machines. This is achieved because the two-cycle arrangement permits overlap so that the reading operation for a second character may be started while the actuating function of the first character is being completed.

The control apparatus according to the present invention also provides a timing unit which is sufficiently flexible to accommodate variations in timing intervals required as a result of changes in the design of composing machines, in addition to present requirements. For example, present functions requiring a time delay factor are, upper rail, lower rail, duplicate character and add-fixed-space.

A better understanding of the present invention will be obtained from the following description, taken in conjunction with the accompanying drawings wherein:

Fig. 2 is a plan view of a portion of the principal machine illustrated in Fig. 1 showing the control unit in top view;

Fig. 3 is a transverse sectional view through the keyboard and matrix release mechanism taken approximately on line 3—3 of Fig. 1;

Fig. 4 is a transverse sectional view through the keyboard illustrating the striker bar operating mechanism;

Fig. 7 is a side elevation of the control unit showing the assembler elevator partially in section;

Fig. 8 is a detail perspective view of several matrices in two-position assembled relation;

Fig. 13 is a detail sectional view illustrating the power take-off clutch control mechanism;

Fig. 14 is an exploded perspective view of the timing mechanism;

Fig. 16 is a detail sectional view taken on line 16—16 of Fig. 12;

Fig. 17 is a fragmental sectional view showing the tape feeding arrangement;

Fig. 18 is an elevational view showing the add-fixed-space storage mechanism;

Fig. 19 is an end view of the mechanism shown in Fig. 18, and

Fig. 20 is a plan view of a fragment of control tape containing signals for releasing a spaceband alone, a fixed space matrix alone, and for releasing both sequentially.

Figure 1:
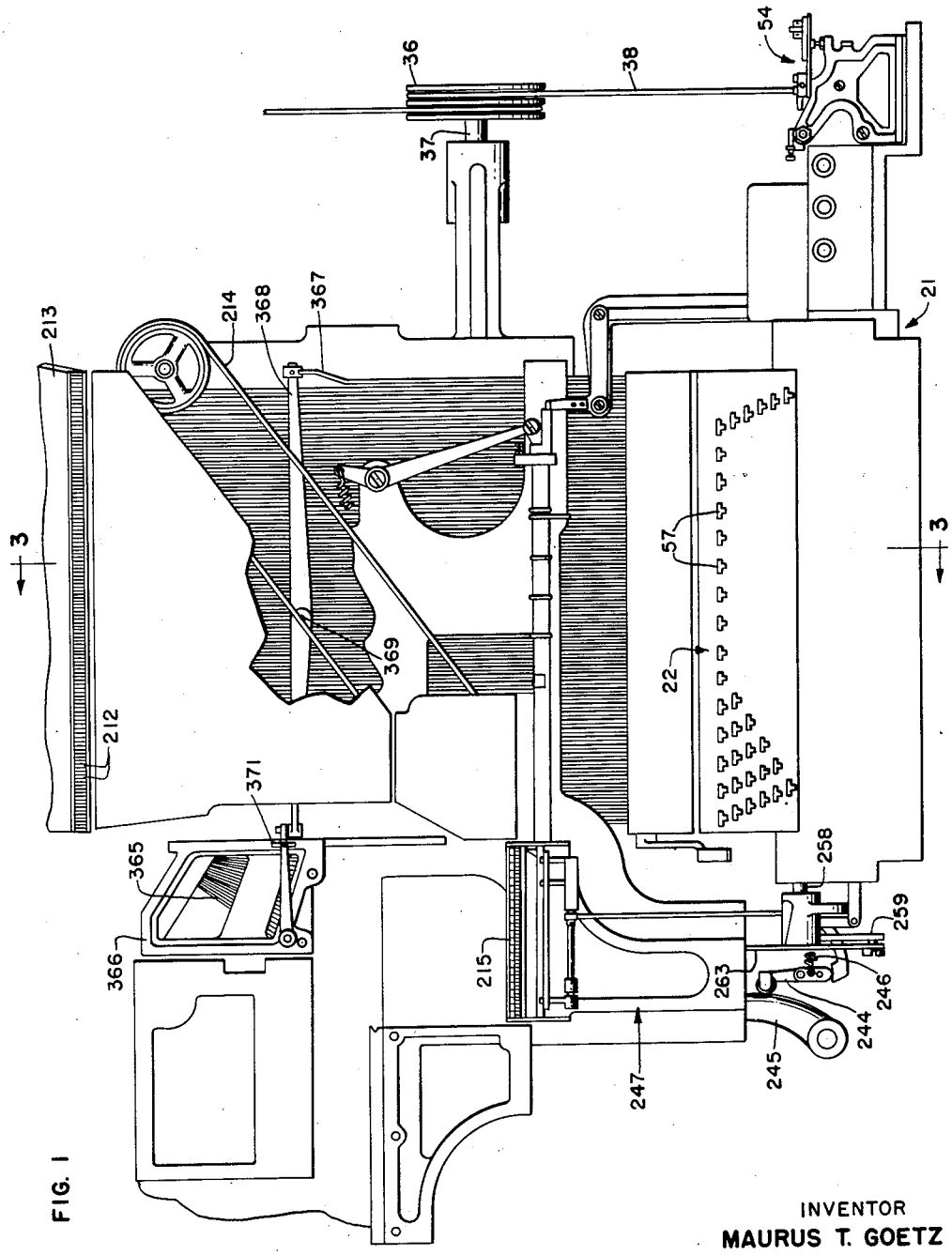
Fig. 1 is a front elevation of a standard line casting machine having applied thereto an automatic control unit embodying the present invention.
Figure 6:
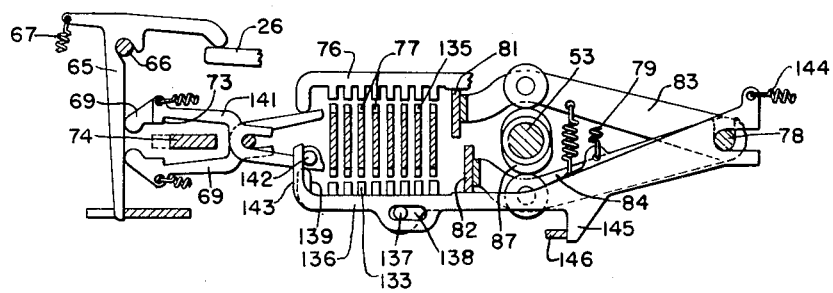
Fig. 6 is a transverse cross sectional view through the keyboard illustrating the selectable elements for controlling the shift mechanism.

Referring now to the accompanying drawings in which like reference characters designate similar parts throughout the several views, Figs. 1 and 2 illustrate generally the application of the present device to a line casting machine. In its preferred form the present invention comprises a unitary structure that is almost entirely supported on the main or principal framework 21, such as illustrated in Fig. 6 of U. S. Patent No. 2,091,286 granted August 31, 1937, to H. L. Krum et al. This framework is mounted beneath a standard keyboard 22, Fig. 1, customarily provided in line casting and composing machines. While in the case of the majority of the weight bars 59 (Fig. 3) there is provided not only a manually operated keylever 57 but also an independent automatically operated lever 27, it will be noted that this is true in the case of those characters whose manually operated keylevers are situated in the lower two of the six horizontal rows of keylevers, Fig. 3. In the case of these two rows of keylevers, instead of providing separate automatically operated levers 27, each keylever 57 has been modified by the addition thereto of an off-set portion 26 generally similar to the corresponding portions 26 of the keylevers 27, but in this case integrally formed with the manually operated keylevers. As indicated in said Patent No. 2,091,286, the major portion of the framework extends under the entire keyboard and supports among other things the permutation bars 77 and the selectable bars 76 (Fig. 3).

Figure 12:
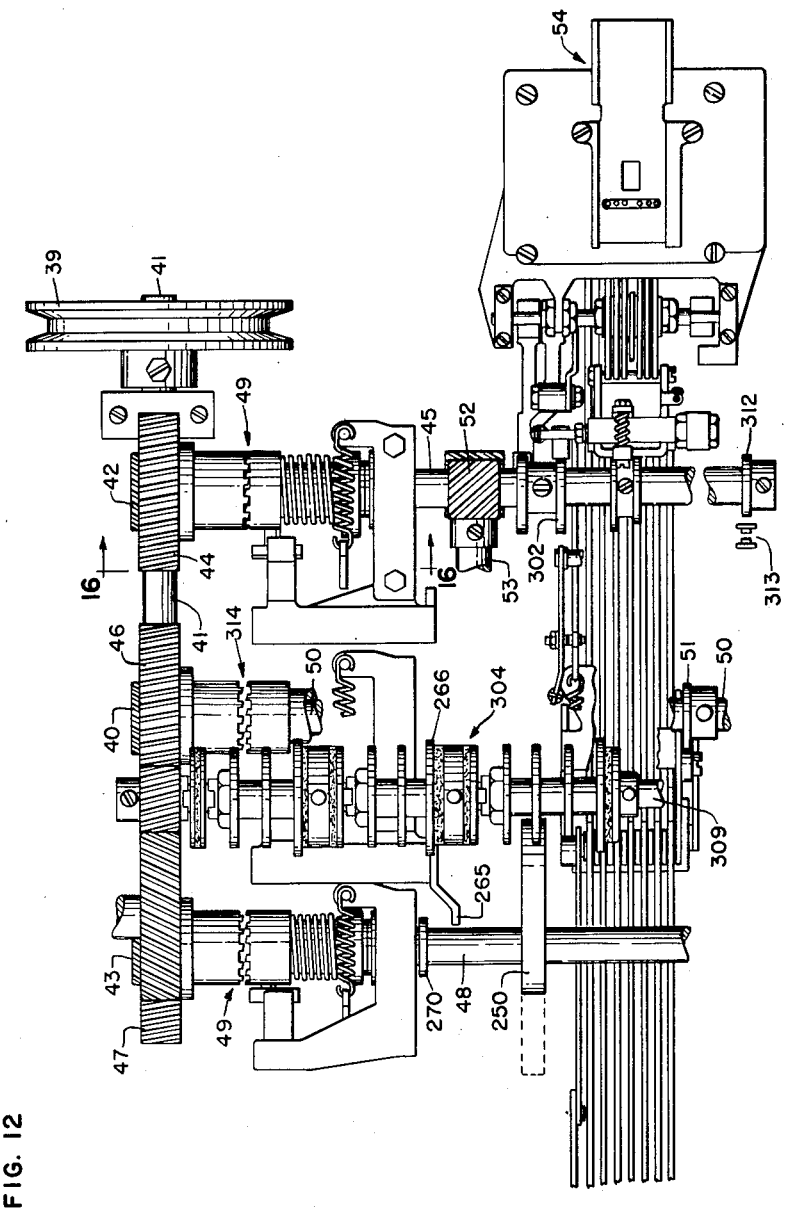
Fig. 12 is a fragmental top view of the tape reader and associated parts.

According to the present embodiment, a suitable driving pulley 36 (Fig. 1), is attached to the intermediate shaft 37 of the principal machine and drives through the medium of a pulley belt 38, a driven pulley wheel 39 (Fig. 2), and a constantly rotating shaft 41, which carries securely mounted to it three worm pinion gears 40, 42 and 43 (Fig. 12). Worm pinion gear 42 drives a worm wheel 44 which is freely mounted on a shaft 45 journaled in suitable bearings that comprise part of the framework 21. Worm pinion gear 43 engages a worm wheel 47 in the same manner as its associated driving worm 42 except that being of somewhat smaller diameter and bearing a correspondingly greater ratio to its driven wheel 47 it imparts a correspondingly slower motion to its driven shaft 48 than is imparted to the driven shaft 45. Likewise, worm pinion gear 40 engages a worm wheel 46 which is freely mounted on a shaft 50. Each of the shafts 45, 48 and 50 is coupled with its respective gear 44, 46 and 47 through spring loaded toothed clutches 49 of similar construction.

Shaft 45 carries three cams that operate the record reader mechanism 54 and will be referred to hereinafter as the record reader shaft, while in addition it also carries a driving gear 52 (Fig. 12) that operates a cam shaft 53. Shaft 48 carries a cam 256 for operating the elevator mechanism, and another cam 270 for disengaging its own driving connection and for controlling the driving connection to the record reader shaft 45 at the conclusion of each cycle of its own operation, and will be referred to hereinafter as the elevator cam shaft. Shaft 50 carries a transfer cam 51 for controlling the operation of an additional transfer mechanism, which is conducive to two-cycle operation of the control unit.

Referring now to Fig. 3, wherein a typical cross-section through the selector and matrix release mechanisms is indicated, attention is directed to the standard keyboard construction in particular contemplation of which this structure has been designed. Keylevers 57 pivoted on shafts 58 are suitably articulated as at 61, to move members or weights 59, admitting of considerable lost motion at their several points of articulation by virtue of excess clearance notches 62. A particular "touch" is obtained by providing a uniform leverage ratio in all of the keylevers, although, as is readily seen, each horizontal row proceeding downwardly is progressively longer than its preceding one. The weights 59 are provided with several notches 62 so as to be adaptable to standard replacement in connection with other of the several keylevers.

Additional levers 27 pivoted at 64 are mounted for engagement with the lowermost notch 62 of certain of the several weights 59 and are provided with offset extensions 26 that protrude through a panel 63 of the keyboard. Thus, it will be seen that as to the release of matrices controlled by keylevers in the upper four rows, Fig. 3, either the manual control levers 57 or the automatic control levers 27 may be operated independently and that in so doing the other or unoperated of the two remains inert and does not in any way enter into motion either associatively or collaterally, but as to the release of matrices controlled by the keylevers in the lower two rows a single lever is utilized for operation both manually and automatically.

An alignment of bell cranks 65 fulcrumed on a common shaft 66 is disposed to overlap the aforementioned extensions 26 so as to engage them when rotated clockwise and against the action of individual springs 67. The vertical arms 68 of the bell cranks 65 register opposite certain ones of a corresponding plurality of interponents 69 which, as will be noted from Fig. 3, are disposed in opposite symmetrical alignments and resemble a scissors-like formation by reason of their particular shape. Both alignments of interponents 69 are primarily supported upon a common shaft 71 about which they are normally urged by their individual springs 72 so that their hook or offset portions 73 are out of cooperable engagement with actuator or striker bar 74. The tail portions of the interponents 69 are in cooperative relation with the extremities 75 of a corresponding plurality of selector bars 76 which, in turn, are cooperable with a series of code bars 77. The selector mechanism embodying the interponents 69 is disclosed in copending application Serial No. 286,403, filed May 6, 1952, by M. T. Goetz, now U. S. Patent No. 2,672,231 issued March 16, 1954. Briefly, the code bars 77 are provided with notches and wards on both top and bottom edges thereof, and in this manner they accommodate a double alignment of selectable bars 76 which are mounted pivotally on a common pivot 78. Confronting pairs of selectable bars 76 are normally biased toward each other by a common spring 79. Bars 76 normally tend to move into selective engagement with the code bars 77 but are restrained therefrom by a pair of spreader bars 81 and 82 supported at each end by cam follower arms 83 and 84, respectively. Arms 83 and 84 are normally biased toward each other by a common spring 85, whereby cam follower rollers 86 carried on said arms are caused to normally ride on the periphery of a spreader cam 87 mounted on the shaft 53.

Also mounted on shaft 53 (as shown in Fig. 4) is a cam 89 which cooperates with a follower roller 91 carried on a bell crank lever 92 pivotally mounted at 93 in the frame 21. Pivotally articulated to the depending arm of bell crank 92 is one end of a link 94, the other end of which is connected pivotally to the striker bail operator 95 carried on pivot 96. Operator 95 is normally biased counterclockwise by a spring 97, and thus through the afore-described linkage the cam follower roller 91 is held against the periphery of the cam 89. Operator 95 is provided with a notch 98 adapted to cooperate with trunnions 99 carried at the extremities of the striker bail 74. It is understood that a cam 89 and associate linkage is provided at each end of the shaft 53, whereby reciprocatory motion is imparted to the striker bail 74.

When the selector bars 77 are set permutatively, as will hereinafter appear, the shaft 53 and cam 87 are rotated to cause bails 81 and 82 to be drawn together by spring 85, whereupon one of the bars 76 will be selected and thereby rock its associated interponent 69 to bring the shoulder 73 thereof into the path of striker bail 74. When striker bail 74 moves to the left (as viewed in Fig. 3) it carries with it the selected interponent 69 to effect the clockwise operation of its associated bell crank 65, whereupon the associated keylever 57 is rocked counterclockwise about its pivot 58 (or 64) to cause the associated weight 59 to be raised. The operation of any of the weights 59 results in releasing a corresponding one of a plurality of time delay mechanisms, indicated generally by the numeral 200. This is accomplished by rotating trigger 201 counterclockwise until it ceases to support its cam yoke 202 whereupon yoke 202 drops until the peripheral teeth 203 of cam 204, which is pivoted between the tines of said yoke, engage a continuously rotating rubber roller 205. The engagement between the teeth 203 and the roller 205 imparts a clockwise motion to the cam 204 which, on account of its eccentricity, raises yoke 202 until its remote end 206 abutting a release reed 207 imparts a timed stroke through the matrix release mechanism, illustrated generally at 208, whereupon yoke 202 is again supported by the trigger 201 pending another release movement.

The purpose of the timed release mechanism, as is generally known, is to permit of sufficient time in the magazine trip 208 without having to expend the same amount of time in depressing a control key 57. The provision of such an element of delay is important in view of the fact that the matrices are released and allowed to gravitate into assembled relation, for without such a delay, and particularly under the speed of automatic control, a direct release means might be actuated and be restored to normal position before its matrix has had time to move from its magazine 209. One of these overlap mechanisms is provided with each of the levers 57 whose function it is to release a matrix 211 from the magazine 209.

Figure 10:
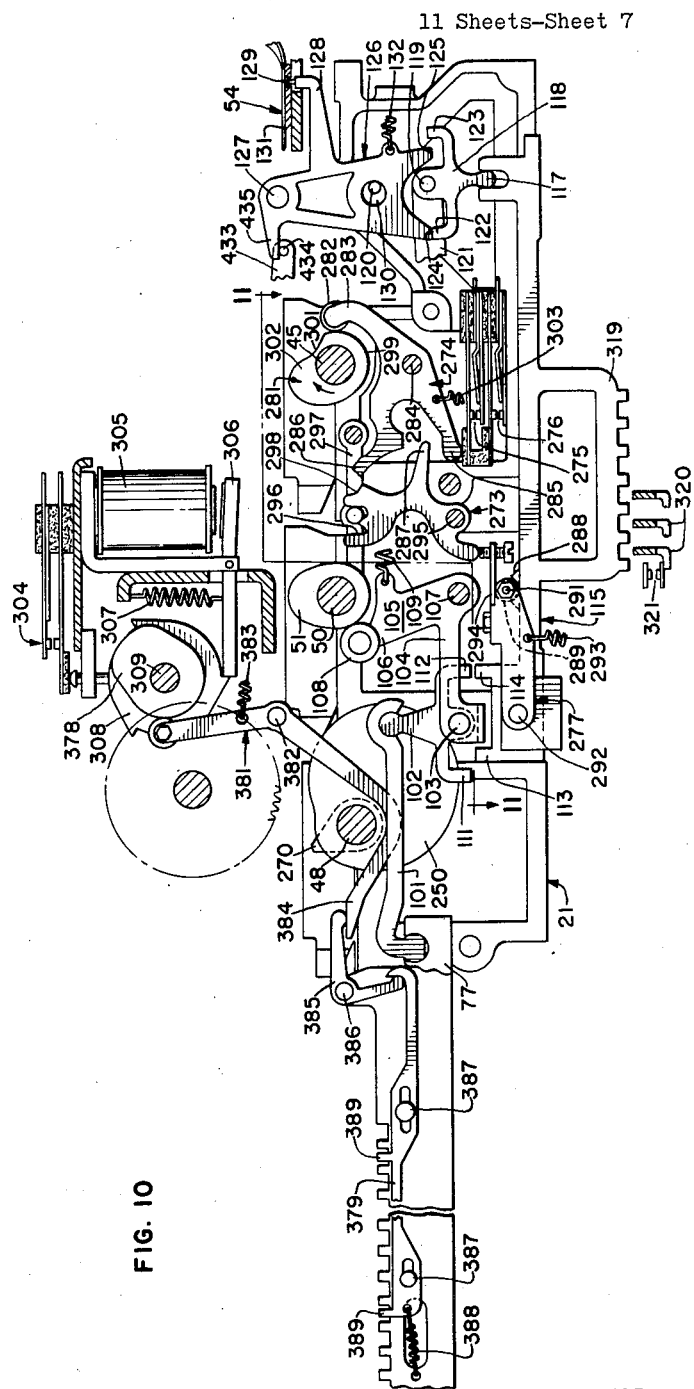
Fig. 10 is a longitudinal cross-sectional view through the record reader mechanism and associated parts.

Referring now to Fig. 10, the right-hand portions of code bars 77 are pivotally articulated to one end of individually associated links 101, the other ends of which are pivotally articulated to individually associated T-shaped transfer levers 102, which are carried pivotally on a pivot shaft 103 mounted in the extremity of one arm 104 of a transfer lever bail 105 comprising arms 104 and 106 pivotally mounted on a pivot shaft 107 appropriately located in the frame 21. Transfer bail 105 carries at the extremity of arm 106 a cam follower roller 108 which cooperates with the transfer cam 51 fixed to shaft 50. Clockwise bias is normally imparted to lever 105 by a spring 109 to hold the roller 108 against the periphery of cam 51.

Transfer levers 102 are provided with a pair of abutments 111 and 112 operatively related to a pair of abutments 113 and 114, respectively, formed on a series of intermediate selector bars 115 which are suitably supported in the frame 21 for longitudinal and parallel movement. The abutments 111 to 114 are so spaced that when either of the two abutments 113 or 114 is brought into registration with its associated abutment 111 or 112, the other of the abutments 113 or 114 just clears its associated abutment. Each of the intermediate selector bars 115 is pivotally articulated at its right-hand end (as viewed in Fig. 10) to the arm 117 of an associated T-shaped transfer lever 118 pivotally carried on a pivot shaft 119 mounted in a transfer bail exemplified by member 121 and comparable to the transfer bail 98 shown in Fig. 16 of said United States Patent No. 2,091,286. Levers 118 are provided with abutments 122 and 123 which are adapted to cooperate with abutments 124 and 125 formed on a corresponding series of tape sensing or feeler levers 126 mounted pivotally on a pivot shaft 127 appropriately carried in the tape reader 54. Levers 126 are each provided with an arm 128 terminating in a tape sensing or feeler pin 129 adapted to sense a tape 131 which has been imperforated with code combinations of perforations in accordance with a six-unit permutation code (in the present embodiment). Levers 126 are provided with an intermediate orifice 130 having sufficient clearance with respect to a fixed rod 120 positioned therein so as to permit of a slight reciprocative motion by the levers 126.

Individual springs 132 tend normally to urge the tape sensing levers 126 to their extreme counterclockwise position and in this way they are cyclically opposed by the action of a reciprocating bail exemplified by the bail arm 433 comparable to the bail 107 shown in Fig. 16 of said Patent No. 2,091,286. Bail 433 is comprised of a transversely extending rod 434 traversing beneath the horizontal extensions 435 integrally formed with the feeler levers 126. The reciprocating bail 433 is pivotally supported in a suitable manner and carries a cam follower roller (not shown) mounted on the shaft 45. Also mounted on shaft 45 is a tape feed cam (not shown) which operates a tape feeding device of the type shown in Fig. 10 of said Patent No. 2,091,286, which comprises an arm 436 (Fig. 17) carrying a tape feed pawl 437 which cooperates with a tape feed ratchet 438. The reciprocatory movement of pawl 437 thus imparts through ratchet 438, step-by-step motion to a feed shaft 439 which carries a sprocket feed wheel 441 whose pins 442 coincide with the central longitudinal row of perforations conventionally provided in the control form or tape 131.

Thus, in accordance with the timed action of bail 433 and bail 121, the set of feeler levers 126 will first be permitted to rotate counterclockwise (to an extent limited by stop 120) during which time those levers 126 whose pins 129 are not blocked by the record tape 131, but are brought into registration with a perforation therein, will be permitted to rotate until their respective abutments 125 register opposite the abutment 123, while the other levers 126 which are not so permitted to rotate counterclockwise will remain in the position shown in Fig. 10, with the abutment 124 in registration opposite the abutment 122.

Immediately following this condition, the transfer bail 121 is actuated counterclockwise to bring the T-levers 118 into engagement with their respective feeler levers 126 and, depending upon which of the two positions the feeler levers 126 happen to assume, T-levers 118 will be correspondingly positioned and will impart a similar positionment to their associated bars 115. In this manner the combination of perforations present in each transverse alignment in the tape is transferred simultaneously to the six code bars 77. Following each such transfer tape 131 is stepped forward until another transverse alignment of perforations is brought into registration with the feeler pins 129.

Particular attention is directed to the fact that while the several feeler levers 126 are brought back to a normal or starting position at some definite point in each cycle of operation, yet the transfer levers 118 and their articulated slide bars 115 are not so restored but remain in their set position until they are given a new setting upon a subsequent operation of the transfer mechanism. This practice permits of an overlap in the operation of the two sets of levers and allows the bars 115 maximum time of rest during each cycle of operation. A further overlap is provided between the operations of the bars 115 and the bars 77 by the additional transfer mechanism comprising transfer levers 102.

The transfer mechanism comprising transfer levers 118 and the transfer mechanism comprising levers 102 are operated sequentially or consecutively, and thus provide for operation of the herein disclosed control unit on a two-cycle basis; that is, the cam shaft 45 is initiated into operation to effect the reading of the tape 131 and the setting of bars 115 in conformance thereto, and near the end of its cycle of operation it initiates the cycle of operation of cam shaft 50 which causes the transference of the code setting from bars 115 to bars 77. Thus, the control unit is designed with two separate operating cycles. This two-cycle approach increases the time available at any given speed to perform certain functions, over the time which is available for the same function in prior one-cycle control systems. This is achieved because the two-cycle arrangement permits overlap so that the reading operation for a second character may be started while the actuating function of the first character is being accomplished.

Figure 5:
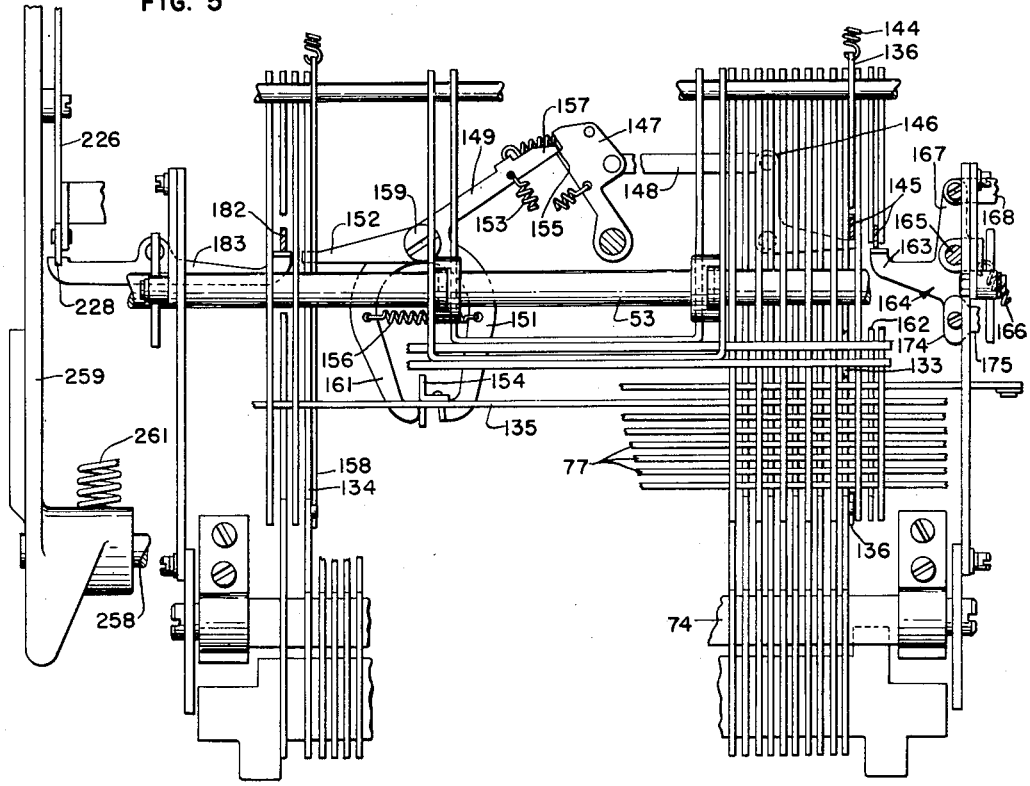
Fig. 5 is an enlarged plan view with parts broken away illustrating the permutation selector mechanism of the control unit, including the shift mechanism.

Of the several code bars 77 in the present embodiment, six of them are positioned in each cycle of operation through the agency of a record reader mechanism 54, while a seventh one 101 is a shift-unshift bar and is positioned by a special structure, shown in Fig. 5, which is subordinated to the previously mentioned six code bars 77.

Certain of the keylevers are employed to effect the shift and unshift functions. Having reference to Figs. 5 and 6, the selectable bars 133 and 134 determine the positioning of the seventh code bar 135 in the following manner: In juxtaposition with bar 133 and cooperably related thereto is a shift pull bar 136 mounted pivotally, like bars 76, on the pivot shaft 78. Pull bar 136 is slidably related to bar 133 through the cooperation of pin 137 fixed to bar 133 with the slot 138 in bar 136 (Fig. 6). Bar 133 is provided with a vertical extremity 139 which functions, when selected, to rotate special interponent 141 about pivot shaft 71 to bring its shoulder 73 into the path of reciprocating bar 74. Incidentally, interponent 141 is not provided with a nose portion cooperable with bell cranks 65, as are the other interponents 69, since interponent 141 does not function through a bell crank 65. Instead interponent 141 is provided on its tail portion with a stud 142 which cooperates with the vertical portion 143 of pull bar 136.

Upon setting the bars 77 in accordance with the shift code signal, the selectable bar 133 will, upon operation of the spreader bail 81—82 be selected and rotate clockwise about pivot shaft 78, thereby through its extremity 139 causing the interponent 141 to rotate counterclockwise to bring the shoulder 73 thereof into the path of operating bar 74. Upon leftward movement of interponent 141 (as viewed in Fig. 6) the stud 142 thereon will cooperate with the vertical portion 143 to move the bar 136 leftwardly against the action of spring 144. When the bar 136 is thus actuated, its depending lug 145 engages one arm of a bell crank 146 rotating it clockwise (as viewed in Fig. 5) and imparting a similar motion to trigger 147 through the medium of a connecting link 148. This movement of trigger 147 liberates lever 149, with which are integrally associated arms 151 and 152, permitting it to respond to the urge of its spring 153 and to attempt to shift permutation bar 135 leftwardly (as viewed in Fig. 5) through engagement of arm 151 with projection 154 of bar 135. In the preferred embodiment of the lever system for shifting the permutation bar 135, a slight clearance is provided between the end of lever arm 151 and the projection 154 of bar 135 when lever arm 149 is retained by the shoulder 155 of latch 147. The purpose of such clearance is that, if for any reason the permutation bar is not shifted by the spring 156 immediately upon actuation of the latch 147, the end 157 of the lever arm 149 shall be released from the shoulder 155 and shall not be restored to retained relation therewith if the latch 147 returns to unoperated position before the bar 135 is shifted. The clearance permits sufficient rotation of the lever 151 and associated arm 149 to assure that upon restoration of the latch 147, the end 157 of lever arm 149 shall be below shoulder 155. The bar 135 is so notched that it does not block the selection of either of the selectable bars 133 and 134 in either of its selecting positions.

Similarly, the selection of companion bar 134, in response to the "unshift" code signal, causes the shifting of permutation bar 135 in the opposite direction; that is, rightwardly (as viewed in Fig. 5). This is accomplished by a similar lug 145 formed integrally with a bar 158 in juxtaposition with and slidably related to bar 134. Bar 158 upon its selective operation, in a manner similar to bar 136, engages arm 152 of the lever 151, moving it counterclockwise about the pivot 159, expanding spring 156, and again latching the projection 157 behind shoulder 155 of trigger 147. A lever 161 connected to the opposite end of spring 156 is urged thereby to shift the bar 135 rightwardly as soon as it is allowed to do so by the relief of frictional restraint upon operation of the spreader device 81—82. Here, as in the first case, the actual shifting of permutation bar 135 is effectuated through the instrumentality of the loaded spring 156. Thus is provided a shifting means for a seventh permutation bar, doubling the permutative possibilities. As already described the six permutation bars 77 are each correspondingly positioned in accordance with the presence or absence of a perforation in its transverse row of the control form. By reason of the two possible conditions of each bar 77 there are afforded sixty-four permutations by the aggregate positions of the six bars. But since the total requirement of a line casting machine standard keyboard is in itself ninety-one operations, there being ninety-one keys, and since with the additional special functions the requirement approaches one hundred and fifteen, the permutations of six bars 77 are not enough, so the seventh bar 135 is added to increase the permutations. However, even though two permutations are utilized in shifting and unshifting the seventh bar 135, the total resulting permutations with seven bars is increased to one hundred and twenty-six.

The selector bar 182 located at the left side of Fig. 5 is adapted to engage one arm of a lever 183, the other arm of which actuates a rail shift mechanism. The matrices 211 (Fig. 3) upon being released from their several channels 212 in the magazine 213 fall into one or another of a plurality of chutes and from there onto an inclined conveyor belt 214 and thence in turn they are collected upon an assembling block 215. This block 215 is provided with a pair of fixed lower rails 216 and a displaceable upper rail 217 (Figs. 7 and 8). When the upper rail 217 is in its dotted line position (Fig. 7), subsequently received matrices assume a position 218; but when this rail 217 is withdrawn as illustrated in solid lines, subsequently received matrices will be permitted to drop completely down so as to assume the position 219 illustrated in dotted lines.

In accordance with the usual practice each matrix is provided with two molding impressions 221 and 222 (Fig. 8), and depending upon which of the two positions that the particular matrix assumes upon the assembling block 215, one or another of the two molding impressions will register opposite the mold chamber in casting the particular slug. The movable rail 217 is articulated to a bell crank lever 223 capable of limited motion and critically adjustable through the medium of stop screws 224—224. A connecting link 225, pivoted to the bell crank 223 at one end thereof, is connected at the other end to a spring loaded lever 226 pivoted at 227. The opposite end of lever 226 cooperates with a shoulder 228 on a trigger lever 229. The trigger 229 thus affords trip engagement with said lever 226 at the shoulder 228. Trigger 229 has an upwardly directed part suitable for manual manipulation, while at the depending end 231 it is positioned for release control by the lever 183 described above (Figs. 5 and 7).

Upon actuation of the selector bar 182, in a manner corresponding to bars 133 and 136, which in turn moves lever 183, this trigger 229 is moved, permitting lever 226 to yield in accordance with the urge of spring 232 and to present the shiftable rail 217 in its effective position (dotted lines). This condition may also be attained manually through the operator's releasing trigger 229 by taking hold of the upwardly directed portion. In this manner, it is possible to assemble part of the line with the matrices in their down or lower rail position, and part with the matrices in their up or upper rail position either under manual or automatic control.

Special selector bar 162 (analogous to bars 133 and 134) is adapted to be selected upon the reception of an elevator operating signal (Fig. 5). A movement forward (leftwardly as viewed in Fig. 6) engages one arm 163 (Fig. 5) of a T-shaped lever 164, thereby rotating it counterclockwise about its pivot 165 and against the action of its spring 166. When so rotated another arm 167 of lever 164 pulls connecting link 168 to thereby rock bell crank 169 clockwise (Fig. 13), which by means of its arm 171 forces disengagement cam lever 172 into effective position for withdrawing driven member 170 (Fig. 16) of clutch 49 and arresting the record reader shaft 45. The other arm 174 of lever 164 is connected to a bar 175 which during the described rotation is thrust rightwardly (Fig. 9) until its offset portion 176 is latched behind shoulder 177 of spring urged lever 178. A vertical portion 179 of bar 175 is pivoted to one end of floating lever 181 through which it moves said lever during its own movement.

When a sufficient number of matrices has been accumulated on the assembling block 215 with which a complete line may be molded, an elevator operating signal is sent through the record reader mechanism 54 which causes the selection of elevator operating bar 162 and the arresting of record reader shaft 45 stopping the feeding of the control form as already described. This selection rotates T-shaped lever 164 moving link 168 leftwardly and slide 175 rightwardly. Since link 168 is connected to clutch release lever 172, its movement leftwardly (as viewed in Figs. 9 and 13) presents clutch release lever 172 into position for engagement with beveled lug 233 (Fig. 16) carried on the driven portion 170 of spring loaded clutch 49. The motion of the record reader shaft 45 continues until lug 233 comes into engagement with lever 172 whereupon it enters the orifice 234, engaging with its beveled edge the corresponding inclined surface 235 of lever 172 and bringing shaft 45 to a stop. In so doing, lug 233 as well as driven member 170 are forced out of engagement with respect to driving clutch member 236 and are temporarily so held by means of a detent lever 237 (Fig. 13) whereby the roller carried thereon is spring urged to fall behind shoulder 238 of disc 239.

Slide bar 175 in moving rightwardly (Fig. 9) is latched by shoulder 177 of member 178 and in association with T-lever 164 imparts a similar motion to one end of floating lever 181 to which it is connected at 241. The opposite end 240 of floating lever 181 is straddled by a yoke 242 which terminates the connecting link 243, whose opposite end is cooperably related to delivery slide control lever 244 located adjacent the delivery slide arm 245 (Fig. 2) and supported so as to be maintained in its extreme clockwise position and against the action of a spring 246 during the time that the delivery slide arm is in its right-hand or normal position. When the slide arm 245 is operated, however, as is the case following a movement of elevator 247, it rocks leftwardly and permits lever 244 to respond to the urge of its spring 246 and rotate counterclockwise, thereby permitting the connecting link 243 to be moved to the left and shifting one end 240 of the floating lever 181 and in this manner contributing in part to the resulting movement of the central portion 248 thereof so that the latter may depart from the depending arm 249 of bell crank 251. The other arm of the bell crank 251 is provided with a shouldered extremity 252 adapted to hold clutch release lever 253 in its effective position for disengaging the elevator power shaft 48. When, however, bell crank 251 is moved by the central portion 248 of floating lever 181, which can occur only upon the combined movement of connecting link 243 and bar 175, the foremost portion 252 of bell crank 251 is raised sufficiently to permit spring 254 (Fig. 13) of clutch release lever 253 to move it out of its effective position, thereby releasing driven member 255 of the elevator clutch 256 and establishing power connection to shaft 48.

The actuation of floating lever 181 is indicative of the following two predetermined conditions; first, that an elevator signal has been received, and second, that the delivery slide arm 245 is in its extreme right-hand or clockwise position, which in turn indicates that the line delivery slide is ready to receive another assembled line of matrices from the elevator. Thus, it will be understood that the elevator operating shaft 48, being controlled through bell crank 251 by floating lever 181, may not be actuated until both of the afore-mentioned conditions are first established. Where, after a previous operation, the elevator has been properly restored and thereafter another elevator operating signal is received, driving power is imparted through gear 47 and driving member of clutch 256 to driven clutch member 255 and to the shaft 48. The elevator clutch 255—256 is a single cycle or single revolution clutch. Having reference to Fig. 13, it is seen that each of the clutch shafts 45, 48, and 50 carries fixed thereon a detent cam or disc 239, 421 and 422, respectively, which cooperates with respective detent levers 237, 423 and 424. It is also observed that the detent cam 421 cooperates with a bell crank lever 425 which coacts with the elevator clutch release lever 253 to limit the revolution of the elevator clutch mechanism to a single revolution, in well known manner. The cyclic rotation of shaft 48 carrying with it an elevator cam 250 raises elevator shaft arm 257 to, in turn, impart rotation to an elevator shaft 258 extending transversely of the keyboard, Figs. 2 and 9. Fixed to the left end of shaft 258, as viewed in Fig. 2, is an arm 259 which is provided with a heavy coiled spring 261, Figs. 2 and 5, one end of which is secured to a projection on arm 259 while the other end is secured to a spring post 262 fixed in the frame. The elevator 247 is connected through link 263 to the arm 259. The contour of cam 250 is such as to effect through arm 257 and shaft 258, the movement of arm 259 for raising and lowering the elevator 247 in cooperation with spring 261.

Figure 9:
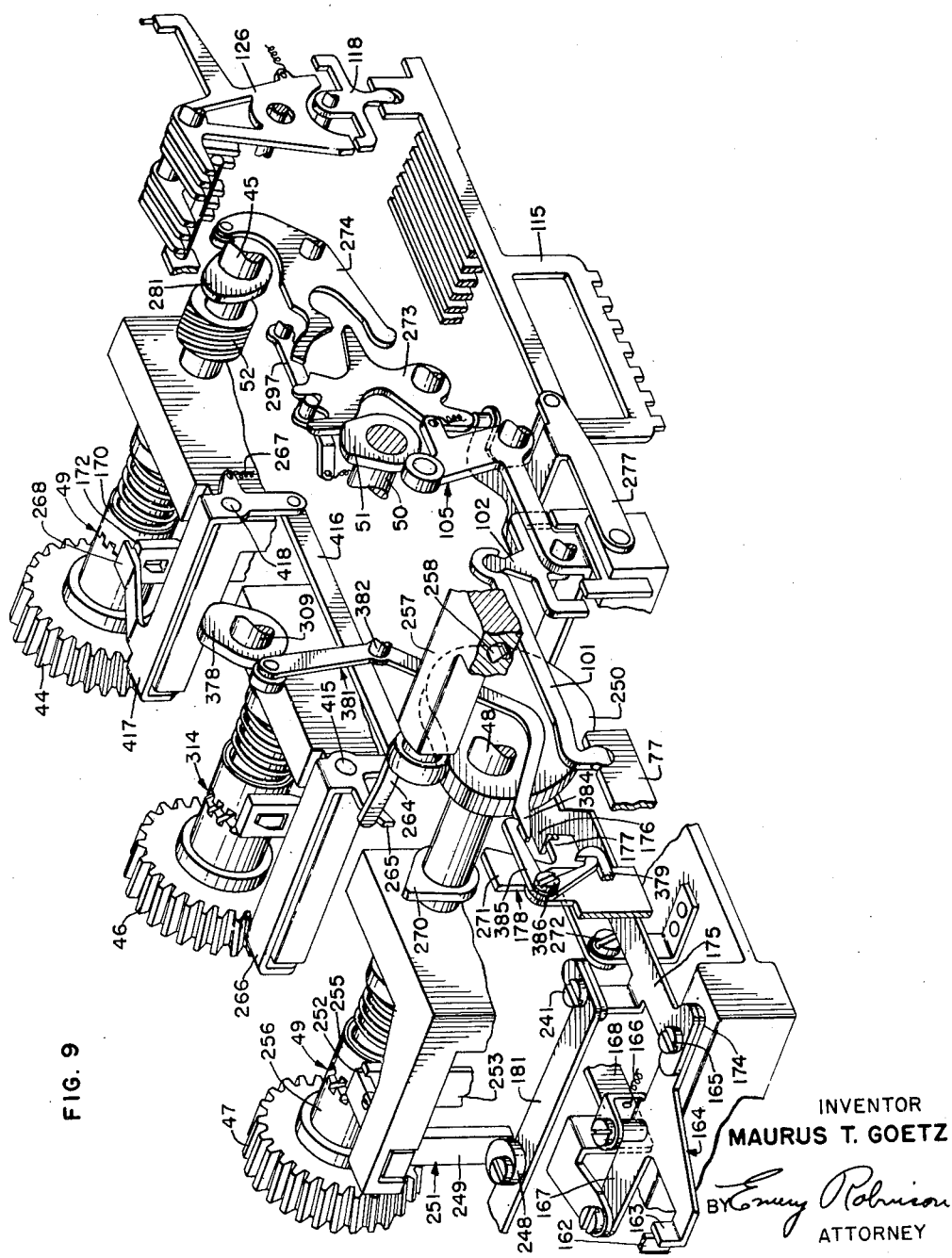
Fig. 9 is a detail perspective view of the power take-off and associated mechanism, including the record reader and the transfer members.
Figure 11:
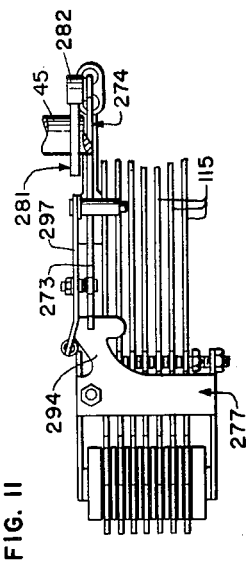
Fig. 11 is a fragmental view taken on line 11—11 of Fig. 10.

A finger 264, Fig. 9, carried by elevator operating arm 257 is adapted to overlie the horizontal arm 265 of a bell crank member 266 pivoted at 415, the depending arm of which is connected to one end of a link 416 (Fig. 18). The other end of link 416 is connected to the depending arm of a release bail 417 (Fig. 9) which is normally spring urged (clockwise as viewed in Fig. 18) by a spring 267 about a pivot 418. As shown in Fig. 9, bail 417 is provided with an arm 268 by means of which it may engage the upper end of clutch release lever 172, as will presently appear. During the rise of arm 257 when the elevator mechanism is first set in motion, finger 264 is lifted away from arm 265 thereby permitting spring 267 to rotate bail 417 and, through link 416, also member 266. The clutch lever 172 is thereby held in operative position for disengaging the clutch 49 of the record reader control shaft 45. When the arm 257 is again lowered, after the elevator has delivered its load of matrices to the delivery slide, finger 264 again engages projection 265 of member 266, thereby, through link 416 and bail 417, permitting clutch release lever 172 to be moved out of operative position and at once releasing the driven member 170 to establish driving connection to shaft 45 to again initiate the tape reading operation.

During the elevator operating cycle and while shaft 48 is rotating, T-lever 164 is maintained for a short duration in its extreme counterclockwise position by means of the off-set portion 176 of lever 175 engaging the shoulder 177 of the trigger member 178 (Fig. 9). Shortly after the shaft 48 is started into rotation, trigger release cam 270 engages side arm 271 of trigger 178 depressing it clockwise about its pivot 272 sufficiently to permit bar 175 to override the shoulder portion 177, thereby freeing T-lever 164, and allowing it in response to spring 166, to again assume its clockwise position. In thus moving lever 164, spring 166 also disengages release lever 172 through the medium of link 168, while at the same time floating lever 181 is partially restored to normalcy through its connection 241 with bar 175 thereby permitting bell crank 251 to again present itself in position for holding release lever 253 in effective blocking position. Shaft 48 then completes its cycle coming to rest again when its beveled lug (identical with lug 233 of clutch 49) re-enters the opening of lever 253. When the elevator shaft is thus actuated, it completes one revolution during which time it performs all of its functions including the holding of record reader shaft 45 in arrested position and thereafter releasing it and disengaging itself.

In addition to the afore-described elevator delay means, further function delay facilities are provided in the apparatus herein described. For example, referring to Fig. 10, a duplicate character delay mechanism is shown, comprising levers 273 and 274, contacts 275 and 276, and bail member 277. Where, in ordinary composition, character matrices are released alternatively and in irregular succession, a given matrix release device 268 (Fig. 3) has sufficient time to restore itself to normal condition so that it may be in readiness for a succeeding operation, though in so doing it requires a somewhat longer period to complete its function cycle than that period which is required by an operating unit to complete its initiating cycle. Where a given signal is repeated one or more times, it has been observed that the occurrence of the next consecutive initiating stroke is in advance of the corresponding operating cycle of the principal machine so that its associated matrix release device is incapable of arriving at its normal position in sufficient time to respond thereto. The apparatus according to the present invention, therefore, includes instrumentalities responsive to consecutively repeated characters for introducing automatically a time delay in the operation of the control unit to thereby adjust the inherent speed thereof with that of its associated linecasting machine.

Mounted on the tape reader shaft 45 is a cam 281 (Fig. 10) which cooperates with a follower roller 282 carried at the extremity of arm 283 of lever 274 which is pivotally mounted on pivot shaft 284. Lever 274 is also provided with arms 285 and 286. Arm 285 controls the pair of contacts 275 and 276 associated with a timing mechanism, to be presently described. Arm 285 also cooperates with an arm 287 of lever 273 to restore said lever 273 to non-blocking position, as will presently appear.

Each of the intermediate selector bars 115 carries integrally on its upper edge a saw tooth cam projection 288. The positions which may be assumed by the several cam projections 288 may vary, depending upon the relative position of the selector bars 115. Presented intermediate the two aforesaid positions and in the path of travel of the projections 288 are a series of anti-friction rollers 289 (one for each bar 115) carried on a shaft 291 journalled in a detent bail member 277.

Bail member 277 is supported pivotally at 292 on the main frame of the apparatus and is normally urged downwardly in detenting direction by a spring 293. The cam projections 288 in either of their rest positions may be found on one side or the other of the transversely arranged rollers 289, but in passing from one position to the other they engage rollers 289, causing the latter to be cammed upwardly. The bail member 277 is provided with an arm 294 which is effective, when bail 277 is thus cammed upwardly, to rotate the blocking lever 273 clockwise about its pivot 295. An adjusting screw is carried at the extremity of arm 294 to provide an adjustable relationship between bail member 277 and blocking lever 273.

Blocking member 273 is also provided with a W-shaped notch 296 adapted to cooperate with a spring actuated detent arm 297. Member 273 is provided with a shoulder 298 adapted to cooperate in blocking relation with arm 286 of lever 274. Cam 281 is provided with a dwell 299, a low portion 301 and a high portion 302. When the roller 282 bears on the dwell 299 the arm 286 of lever 274 is held out of the path of the blocking shoulder 298. Thus, when member 273 is actuated to its clockwise position, the shoulder 298 is presented into the path of the extremity of arm 286, to thereby prevent counterclockwise actuation of lever 274. On the other hand, when member 273 is held in its counterclockwise position (as shown in Fig. 10) by the detent 297, counterclockwise actuation of lever 274 is permitted.

Lever 274 is provided with the arm 285 adapted (in addition to cooperating with contacts 275 and 276) to coact with the arm 287 on the blocking member 273. Thus, when member 273 has assumed its clockwise position to block the counterclockwise movement of lever 274, the member 273 is restored during each cycle to its counterclockwise position by arm 285 acting upon arm 287, because during each cycle of rotation of cam 281 the high portion 302 thereof imparts sufficient clockwise rotation to lever 274 to raise lever arm 285 to coact with arm 287 to swing member 273 into its counterclockwise position.

As previously indicated, arm 285 of lever 274 also operates contacts 275 and 276. This condition is established whenever lever 274 is not blocked by member 273, and lever 274 is thus permitted to rotate to its full counterclockwise position when follower roller 282 rides into the depression 301 of cam 281 under the influence of spring 303.

During normal operation, when there are no repeat characters, tape sensing levers 126 assume their clockwise or counterclockwise position according to the presence or absence of code holes in the tape 131, and then when the transfer bail 121 is rocked in timed relation to the tape sensing or reading operation, one or the other of the abutments 124 or 125 cooperates with one or the other of the abutments 122 or 123, respectively, to rock the T-levers 118 accordingly, to thereby shift the bars 115 rightwardly or leftwardly depending upon whether the T-lever 118 associated therewith was rocked counterclockwise or clockwise, respectively.

It will be recalled that as the bars 115 were shifted rightwardly or leftwardly, the cam projections 288 thereon acted, through arm 294 of bail 291, to rotate the detent lever 273 to its clockwise (or rightward) position to bring the shoulder 298 into blocking relation with the arm 286 of lever 274, thereby preventing lever 274, later in the cycle, from following into the low portion 301 of cam 281. Thus, the contacts 275 and 276 will remain open. Then, near the completion of the cycle just described, the apex 302 of cam 281 functions to rock lever 274 slightly to cause arm 285 to cooperate with arm 287 to return lever 273 to its leftward or counterclockwise position.

When a code signal is to be repeated, the selectors 126 are first set in accordance with the initial appearance of said repeated code signal as just described in connection with a normal operation, since in so far as the tape reader is involved, it is not yet known that a signal is to be repeated. Accordingly, at the beginning of the repeat cycle (which is the second occurrence of the character code signal being repeated) the tape sensing or feeler levers 126 are already set according to the code perforations of the repeated character. Because of this, no movement of bars 115, and hence cam projections 288, has occurred, and as a result thereof the position of the block lever 273 has not been altered, but instead remains in the position shown in Fig. 10, so that the arm 286 of lever 274 is not blocked. Therefore, the delay lever 274 is now permitted to follow the cam 281, so that when the follower roller 282 rides into the depression 301, the lever 274 responds to the pull of spring 303 and is rotated counterclockwise to close the contacts 275 and 276 to control the operation of a timing mechanism.

indicated generally by numeral 304 (Fig. 10) and suitably mounted atop the record reader mechanism 54. Contact 276 is connected to one of the magnets 305 of the timing mechanism 304, which magnet, upon closure thereof in response to repeated characters, will be energized to thereby rotate its armature 306 counter-clockwise against the action of spring 307, out of engagement with the stop disc 308 to initiate rotation of the associated cam sleeve on the timing shaft 309 to provide duplicate character delay, as will presently appear. The speed of rotation of the timing shaft is predetermined to afford the appropriate time interval of delay to assure the performance of the various functions controlled thereby.

Figure 15:
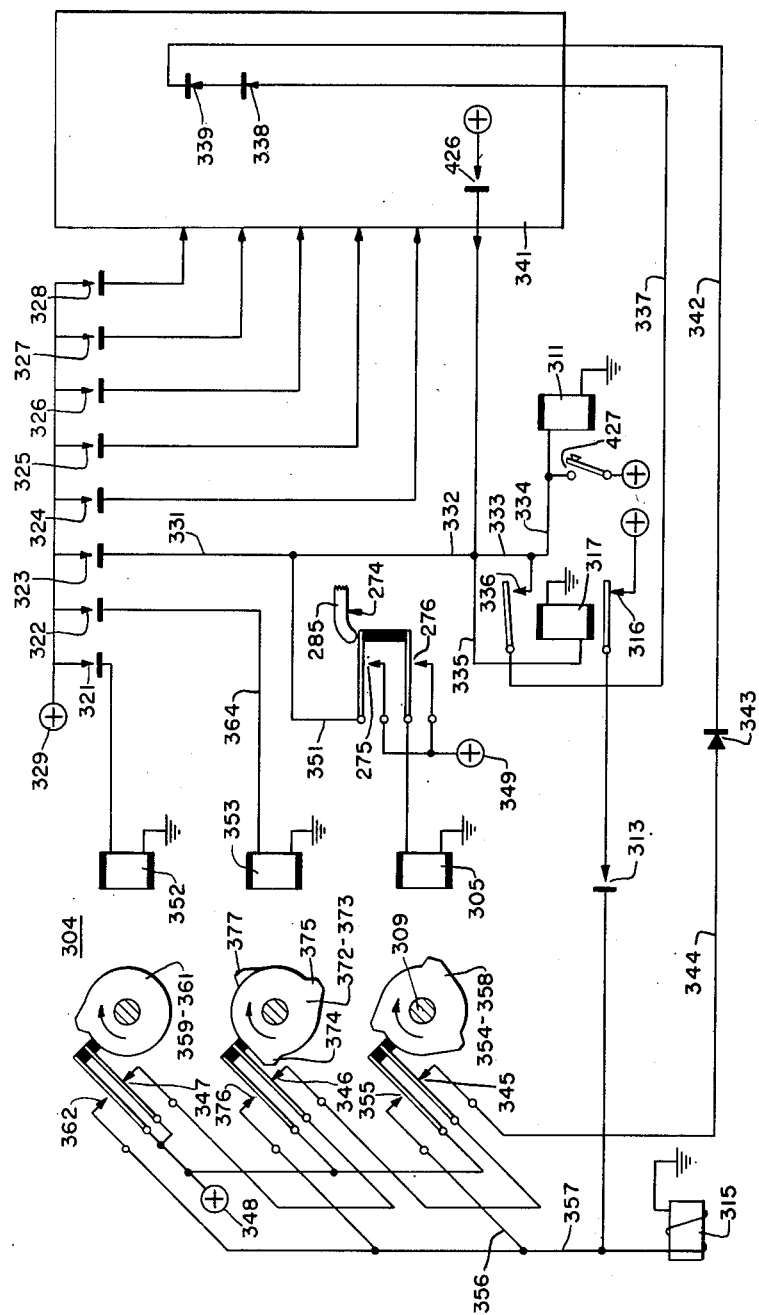
Fig. 15 is a schematic circuit diagram of the timing mechanism according to the present invention.

Referring to the circuit diagram shown in Fig. 15, the magnet 311 for controlling the rotation of the record reader shaft 45 is normally de-energized, to thereby permit the clutch 49 to be engaged (see also Fig. 13), to thereby render the tape reader shaft normally rotating. Carried on the tape reader shaft 45 is a cam 312 (Fig. 12) for cyclically operating a pulsing contact 313 (Figs. 12 and 15). The actuating unit is equipped with a separate clutch 314 (similar to clutch 49) controlled by a magnet 315 through its armature bell crank 330. Under normal conditions magnet 315 is energized near the end of the reader cycle by pulsing contact 313, to cause the actuating unit to perform its normal cycle. It will be observed that this obvious control circuit (Fig. 15) for magnet 315 passes through a back contact 316 on relay 317 so that actuation or energization of relay 317 interrupts this circuit and prevents the normal tripping of the actuating unit clutch 315, as will be seen in connection with certain functions requiring a delay interval.

The contacts 321 to 328 (Fig. 15) are selectively operated under the control of the depending portions 319 of the bars 115 (Fig. 10), in the manner disclosed in U. S. Patent No. 2,098,973 granted November 16, 1937 to A. H. Reiber, whereby a plurality of bails 320 are selectively actuated in accordance with the permuted arrangement of the notches and wards in the bottom edges of the depending portions 319. Contact 323 is a universal contact and is closed each time one of the contacts 321, 322, or 324 to 328 is closed. Upon each closure of the latter contacts, a circuit is completed from positive battery, through universal contact 323, over conductors 331, 332, 333 and 334, then through windings of magnet 311 (Figs. 13 and 15) to ground, thereby operating magnet 311. A circuit is also completed from battery, through universal contact 323, and over conductors 331, 332 and 335, then through the winding of relay 317 to ground. Relay 317 upon operating opens contact 316 and closes contact 336. The closure of contact 336 establishes a locking circuit for magnet 311 extending from ground, through magnet 311, over conductor 334, through contact 336 (now closed), over conductor 337, through control contacts 338 and 339 in the composing machine 341, over conductor 342, through a manual control contact 343 on the operating unit, over conductor 344, then through three normally closed contacts 345, 346 and 347 in the timing unit 304, to battery 348.

In the performance of the duplicate character delay function, previously alluded to, the universal contact 323 is not operated (that is, closed) but instead, contacts 275 and 276 are closed in response to the operation of lever 274, as previously described. The closure of contact 275 establishes a circuit for the energization of magnet 311 from battery 349, through contact 275, over conductors 351, 332, 333 and 334, then through the winding of magnet 311 to ground. At the same time, a circuit for the energization of relay 317 is completed from battery 349, through contact 275 (now closed), over conductors 351, 332 and 335, then through the winding of relay 317 to ground. Relay 317 upon operating, establishes a locking circuit for magnet 311, as previously traced, through its contact 336 (now closed).

Relay 317 also becomes locked up over the same locking circuit over conductors 335 and 333, and contact 336. Contact 316 upon being held open during the delay period prevents the operation of magnet 315 of the actuating unit, even though pulsing contact 313 is closed cyclically. Any one of the series contacts in the locking circuit for relay 317 and magnet 311 may be opened at the appropriate time to release the locking relay 317 to restart the tape reader operation.

The timer 304 consists of three separate, frictionally driven timing elements (as shown in Fig. 14), each element being controlled by an individual tripping device under the control of an individual magnet 305, 352 and 353 (Figs. 14 and 15). Resuming the description of the duplicate character delay function, it is assumed that a double "E" sequence is encountered in the record tape 131 and that it is desired to insert a delay between the first actuation of the "E" keylever 57 and the second actuation of the same "E" keylever on the composing machine, such delay being needed to allow the composing machine to complete its response to the first actuation and arrive at a condition wherein a second actuation will dependably result in release of a second "E" matrix. The first "E" is sensed by the reader in the usual manner, and near the end of the reading cycle the pulsing contact 313 closes momentarily. This energizes magnet 315 of the actuator which then transfers the selection from the reader code bars 115 to the actuator code bars 77. Continuation of the actuating cycle results in the "E" keylever being selected for the first time.

While the actuating cycle above-described, is in process, the reader proceeds to read the second "E." Since the combination in the tape is identical to that already present in the reader code bars 115, none of the code bars 115 move as a result of this reading. This brings into operation the duplicate character contact mechanism shown in Fig. 10, comprising contacts 275 and 276. The closure of contact 276 in the manner previously described effects the energization of magnet 305 of one section of the timer unit 304, over the obvious circuit shown in Fig. 15, thereby permitting the associated cam assembly to start its rotation. As previously described, contact 275 closes at the same time and effects the energization of reader magnet 311 and locking relay 317, causing the record reader 54 to stop at the end of the cycle just mentioned, and also preventing the tripping of the actuator mechanism by the pulsing contact 313 because contact 316 is held open.

At this point, therefore, the tape reader has read two "E" characters in sequence and has come to rest, the actuator mechanism has selected one "E" character matrix and has come to rest, and the timer unit has begun an operating cycle directed toward inserting the appropriate amount of time to permit the composing machine to reach a condition wherein the second "E" can be dependably selected. As the section of the timer unit 304 just released for rotation by magnet 305, reaches the end of one-third revolution (Fig. 14), cam 354 closes contact 355, thereby establishing an energizing circuit for magnet 315 of the actuating unit extending from battery 348, through contact 355 (now closed momentarily) over conductors 356 and 357, then through the winding of magnet 315 to ground. Cam 358 of said section of the timer unit 304 opens contact 345 thereby opening the locking circuit (previously described) for relay 317 and magnet 311, thereby restoring the tape reader 54 to operation. When this occurs, the actuator unit effects the selective operation of the "E" keylever on the composing machine for the second time, and the record reader 54 proceeds to read the next character in the tape. In summary it will be observed that this entire operation did not involve any blocking of the tape in the mechanism, and that the sole function of the timer 304 was to defer the actuation of the second "E" and also the reading of the next character for a measured delay interval.

Another function of the composing machine requiring a measured delay interval in order to properly effectuate the noted operation is the upper-lower rail shift function, which is in certain respects similar to the duplicate character delay arrangement. Having reference to Figs. 10 and 15, the contact 321, operated in response to a predetermined permutative setting of bars 115, controls the introduction of the delay interval assigned to the upper-lower rail shift function. As will be recalled, the operation of contacts 321 and 322, and 324 to 328 are effected selectively through the instrumentality of depending portions 319 of bars 115 in a manner disclosed in U. S. Patent No. 2,098,973 granted November 16, 1937 to A. H. Reiber. The contact 323, however, is a universally operated contact and is closed concurrently with the closure of any of the latter contacts. Thus, in response to the rail shift code signal the contacts 321 and 323 will be closed momentarily. The closure of contact 323 will cause the tape reader magnet 311 to operate, thereby arresting the tape reading operation. At the same time, relay 317 will operate to provide a locking circuit for magnet 311. Before the arrestment of the instant tape feeding cycle, the pulsing contact 313 will be operated but will have no effect on magnet 315 because contact 316 has been opened. The closure of contact 321 controls the energization of magnet 352 to initiate the rotation of that section of the timer 304 that controls the rail shift delay interval. Cam 359 causes contact 362 to be closed to complete an energizing circuit for magnet 315 from battery 348, through contact 362, over conductor 357 and through winding of magnet 315 to ground, thereby initiating the operation of the actuating unit to effect the selective operation of the rail shift selector bar 182 (Fig. 5) to control the operation of the rail shift member 217, as previously described. Cam 361 causes contact 347 to be opened to break the locking circuit for relay 317 and to restart the tape reader by de-energizing magnet 311.

In the composition of material to be printed, it is the custom to finish all lines except certain short ones on a fixed right-hand margin. In composing machines of the line-casting type, this operation, called justification, is accomplished through the use of expansible spacebands to provide interword spaces. As a line is concluded, if the expansibility afforded by the included spacebands is sufficient to expand the line until it fills the required column width, the line is said to be justifiable. It may sometimes happen that a composed line which is short of justifiable length will not accommodate the next word or the next syllable of that word. The compositor may increase the length of the line by inserting fixed spaces, which are blank matrices of uniform thickness, adjacent the spacebands.

In accordance with the present invention, it is proposed to control automatically the release of fixed spaces to accompany a deficient line, without the insertion of signals particularly associated with the release of fixed space matrices, and by the modification of one or more of the spaceband signals in the line. The modification comprises the perforation of an additional code hole or holes whereby the ordinary spaceband signal is converted into an extraordinary spaceband signal, as indicated in Fig. 20, wherein is shown the code signal for controlling the selection of a fixed space matrix alone, or a spaceband alone, or a fixed space and spaceband together.

When the 0-3 combination, assigned to the add-fixed-space function, is read by the reader 54, the bars 115 are set correspondingly to effect the selection and closure of contact 322 (Fig. 15). As previously mentioned, the universal contact 323 also closes. Contact 322, upon closing, completes a circuit for energizing magnet 353 of the timer 304, extending from battery 329, through contact 322, over conductor 364 and through the winding of magnet 353 to ground. At the same time, the closure of the universal contact 323 causes the energization of magnet 311 and locking relay 317 over previously described circuits, thereby stopping the reader at the end of its cycle and interrupting the normal control path, through contact 316, to magnet 315 of the actuating unit.

The release of spacebands 365 from the spaceband storage magazine 366 (Fig. 1) is effected by the lifting of a special release reed 367, which is controlled by the selector mechanism shown in Fig. 3. A lever 368 pivoted intermediate its ends, as at 369, has one end connected to the spaceband release reed 367, and has the other end connected to the spaceband escapement mechanism 371. The closure of contact 322 thus controls the operation of magnet 353 to initiate the rotation of that section of the timer 304 that controls the add-fixed-space delay interval. Cam 372 is provided with two cam projections or humps 374 and 375 for controlling the contact 376, and cam 373 is provided with one cam projection 377 for controlling contact 346. Thus, during a single cycle of rotation of the add-fixed-space section of the timer 304, the cam 372, through its first hump 374, causes contact 376 to be closed a first time (contact 346 which is controlled by cam 373 is not opened at this time) to complete an energizing circuit for magnet 315 from battery 348, through contact 376, over conductor 357 and through winding of magnet 315 to ground, thereby initiating the operation of the actuating unit to perform one cycle during which it selectively operates the spaceband mechanism 371 in the composing machine to release a spaceband 365 from the spaceband magazine 366 permitting it to drop into the assembling elevator 215.

At the end of the first cycle just described, the timer unit 304, through a second operation of contact 376 by the second cam projection 375, again trips the actuating mechanism to effectuate the selection of a fixed space (thin space) matrix from magazine 213. However, a conditioning or code changing operation of the selector mechanism takes place substantially simultaneously with the second closing of contact 376, as follows: It is observed in Figs. 10 and 14 that a further cam 378 is provided in the add-fixed-space section of the timer unit 304. Cam 378 functions in proper timed relation with the second closing of contact 376 and the ensuing energization of magnet 315 to initiate a second cycle of operation of the actuating unit, to permit the shifting of the code-changing code bar or instrumentality 379 (Fig. 10) leftwardly. Referring to Fig. 10, this is accomplished by cam 378 acting upon a bell crank lever 381 pivoted at 382 and normally biased clockwise by a spring 383. Arm 384 of bell crank 381 cooperates with the horizontal arm of an intermediate bell crank 385 pivoted at 386, the depending arm of which cooperates with the hooked extremity of the code changing bar 379. Bar 379 is slidably mounted on studs 387, and is normally tensioned leftwardly by a spring 388. Therefore, at the end of the first cycle, the timer unit 304, through a second operation of contact 376, again trips the actuating mechanism, and cam 378 on the timer causes the code changing mechanism to operate, thereby changing the code by shifting the code lugs 389 characteristically to block the selection of the spaceband selector bar and to unblock the thin-space selector bar, so that the thin-space reed (not shown) is operated in this second cycle, instead of the spaceband reed 367. Following completion of this second cycle, the contact 346 on the timer is operated by its cam 373, thereby breaking the locking circuit for relay 317 and to restart the tape reader by de-energizing the magnet 311.

With the arrangement according to the present invention, means is provided whereby the selector apparatus will be conditioned, upon responding to the first 0-3 or extraordinary spaceband signal in a line, for releasing a fixed space matrix in response to each subsequent spaceband signal in the line whether such subsequent spaceband signal is the ordinary spaceband signal (namely, 3) or has been converted to the extraordinary signal, 0–3. In other words, in the practice of the invention, means is provided in a linecasting and composing machine for releasing spacebands and fixed spaces in response to a predetermined code signal which comprises changing only the first spaceband signal in the line pursuant to which the mechanism will automatically add a fixed space to each succeeding spaceband for the remainder of the line, whereupon the elevator signal will restore the arrangement to normal condition.

This result is accomplished by the arrangement according to the present invention, in the following manner: Having reference to Fig. 18, the depending portion 319 of the "0" selector bar 390 (of the set of bars 115) carries pivotally thereon a pair of cooperating T-shaped levers 392 and 393. Lever 392, pivoted at 394, is provided with a vertical arm 395 terminating in a latching shoulder 396, and a horizontal arm 397 terminating in a downwardly directed portion 398 coinciding with a notch in the lower edge of the 0-bar 390. Lever 392 is normally urged clockwise by a spring 399. Arm 395 of lever 392 cooperates in a latching manner with the end of arm 402 of lever 393 which is pivoted at 403. Lever 393 is also provided with a depending arm 404, the free end of which is adapted to simulate a ward in the bottom edge of the depending portion 319 of bar 390. Arm 404 of lever 393 is also provided with a laterally extending portion 405 adapted to cooperate with a screw 406 adjustably carried on an arm 407 of a bell crank lever 408 mounted pivotally on the pivot 403.

The add-fixed-space contact 322, previously referred to, is controlled by one of the bails 320 according to the manner described in said Reiber Patent No. 2,098,973. The web portion 409 of bail 320 is positioned beneath the end 398 when the 0-bar 390 is in its rightward or marking position. But when the bar 390 is in its spacing or leftward position, the end 398 has shifted out of the path of the web portion 409, and the lower end of arm 404 (when the levers 392 and 393 are still in latching relation as illustrated in Fig. 18) will be positioned above said web 409 to prevent selection of bail 320, and hence contact 322 will not be closed. However, if levers 392 and 393 have become unlatched as previously described, the lower end of arm 404 will not be able to block the selection of bail 320, and so, contact 322 will be closed whether the 0-bar is either in its rightward or leftward position. It is thus seen that, because of this movable ward, exemplified by the end of arm 404, the arrangement just described provides a means of conditioning the control unit so that the first sensing of the 0–3 code combination (411, Fig. 20) will establish a condition wherein the same bail 320 will subsequently be selected on the spaceband combination "3" (412, Fig. 20). In the practice of this invention, the value of this arrangement resides in the fact that fixed spaces can be inserted throughout a line by the modification on the part of the perforator operator of only one spaceband code combination in that line.

The movable ward exemplified by extremity 404 is reset at the end of the line in the following manner: On the elevator shaft 48 there is fixed a reset cam 412 which is adapted to cooperate with a slidable bar 413 articulated to lever 408 which is normally urged counterclockwise (as viewed in Fig. 18) by a spring 414. Bar 413 is thus also held in its leftward position in cooperative relation with cam 412 by said spring 414. Then, when the shaft 48 is released for one cycle (or revolution) in response to the elevator (or end-of-line) signal, as hereinbefore described, the cam 412 will urge bar 413 momentarily in a rightward direction to impart a clockwise movement to lever 408, whereupon the screw 406 carried on projection 407 will coact with projection 405 to rotate lever 393 clockwise to effect a latching engagement between arm 402 thereof and shoulder 396 of lever 392.

Also shown in Fig. 15 is a contact 426 which is representative of the various safety contacts on the line-casting machine or composing machine 341, the closure of any one of which will arrest the operation of the control unit described herein. When this has occurred, and after the trouble on the linecasting machine has been cleared, the control unit can be restarted by the manual opening of contact 343. When the control unit according to the present invention is in the idle condition, the manually operated contact 427 is maintained closed to complete an obvious circuit for the magnet 311, it being remembered that the energized condition of magnet 311 holds the tape reading clutch 49 disengaged. Contacts 324 to 328, inclusive, are associated with such features as quadding and centering, and upper magazine and lower magazine selection, not herein described since such features are essentially a part of the linecasting and composing machine.

Although a specific embodiment of the invention has been shown in the drawings and described in the accompanying specification, it is understood that this invention is not limited thereto, but is capable of modification and rearrangement without departing from the spirit and scope of the invention.

What is claimed is:

1. In a composing machine, a plurality of matrix releasing elements, a permutation mechanism controlled by signal storage tape for operating said matrix releasing elements, a cam shaft, means on said cam shaft for effecting the step-by-step advancement of the tape during the rotation of said shaft, a clutch through which power is communicated to said shaft, a first transfer mechanism, means on said cam shaft for rendering said first transfer mechanism effective, a second transfer mechanism, a contact means, means on said cam shaft for controlling said contact means, a second shaft, cam means controlled by said second shaft for operating said second transfer mechanism, and means controlled by said contact means for controlling operation of said second shaft, whereby said second transfer mechanism is rendered effective.

2. In a control unit for a composing machine, a first set of code bars, a corresponding set of signal responsive elements each related to one of said code bars, a transfer means for positioning each code bar in accordance with its related element, a first operating means for said transfer means, a second set of code bars, an additional transfer means for positioning said second set of code bars in accordance with the setting of said first set of code bars, a second operating means for said second set of code bars, and means controlled by said first operating means for controlling the operation of said second operating means, whereby a complete overlap of cyclic operations of said first and second sets of code bars is provided.

3. In an automatic control machine, the combination of a plurality of selectable actuating members, a first set of permutation elements, a set of feelers for sensing perforations in a control form, a first set of transfer levers for receiving a code setting from said feelers and imparting it to said first set of permutation elements, a first operating means for said first set of transfer levers, a second set of permutation elements for selectively conditioning said actuating members individually, a second set of transfer levers for receiving a code setting from said first set of permutation elements and imparting it to said second set of permutation elements, a second operating means for said second set of transfer levers, and means controlled by said first operating means for controlling the operation of said second operating means, whereby a complete overlap of cyclic operations of said first and second permutation sets is provided.

4. In a composing machine, the combination of an assembling block for receiving selectively released matrices from which a printing slug is to be cast including a rail shiftable into two positions to accordingly support or reject subsequently received matrices, apparatus for shifting said rail, a record reader responsive to various signals stored in a tape, selector bars controlled by said record reader, timing means comprising cam operated contacts and electromagnetic control means therefor, circuits for said timing means comprising contacts controlled by said selector bars, and universal means cooperable with said selectable contact means to render said timing means effective, whereby the operation of said rail shifting apparatus is effectuated.

5. In an automatic control machine, a tape feeding device, a continuously rotated driving source for operating said feeding device, a first set of permutation bars, a first transfer means controlled by said driving source to selectively set said first set of permutation bars, an intermittently operated driving source, a second set of permutation bars, a second transfer means, and means controlled by said continuously driving source to control the operation of said intermittently operated driving source to operate said second transfer means to impart to said second set of permutation bars a setting set up in said first permutation bars, whereby a complete overlap is provided.

6. In combination, tape controlled means, a plurality of settable members set according to the operation of said tape controlled means, operating means, means cooperating with said operating means, said cooperating means comprising a blockable portion and a contact operating portion, a pair of contacts to be operated by said contact operating portion, cam projections on said settable members adapted to normally control said blocking portion to block said contact operating portion, said cam projections effective under an inert condition of said plurality of settable members indicative of consecutive occurrences of similar code indicia in the tape to render said blockable portion ineffective to block said contact operating portion, whereby said contact operating portion is effective to operate said contacts, and a timing means, one of said contacts effective to control the initiation of operation of said timing means, and the other of said pair of contacts effective to preclude the operation of said tape controlled means to thereby introduce a time delay factor commensurate with the time measured by said timing device.

7. In a composing machine, a plurality of matrix releasing elements, a permutation mechanism controlled by signal storage tape for operating said matrix releasing elements, a cam shaft, means on said cam shaft for effecting the step-by-step advancement of the tape during the continuous rotation thereof, a clutch through which power is communicated to said shaft, a first transfer mechanism, a second transfer mechanism, a pulsing contact, a pulsing cam on said shaft for pulsing said contact, a second shaft, cam means controlled by said second shaft, and means controlled by said pulsing contact for controlling operation of said second shaft, said cam means being effective upon operation of said second shaft to control the operation of said second transfer mechanism, whereby a complete overlap is provided.

8. In a control unit for a composing machine, said machine having a plurality of instrumentalities to be actuated, a tape feeding device, a continuously operative driving source for operating said feeding device, a first set of permutation bars, a first transfer means controlled by said driving source to selectively set said first set of permutation bars, an intermittently operative driving source, a second set of permutation bars, a second transfer means, means controlled by said continuously operative driving source to control the operation of said intermittently operative driving source to operate said second transfer means to impart to said second set of permutation bars a setting set up in said first set of permutation bars, said second set of permutation bars having double edged code notch accommodations, a plurality of pairs of attrahently biased members having confronting edges cooperable with respective ones of said code notch accommodations, spreader means interposed between the members of said pairs to effectuate the actuation of said members toward and away from said permutation bars, a plurality of interponents each responsively associated with a member, and an operating bar, said interponents having facilities engageable with said operating bar, whereby upon a selective response of said members under the control of said tape feeding device through said first and second transfer means an associated interponent is brought into engaging relation with said operating bar to actuate an instrumentality while a successive instrumentality is being selected.

9. In a control unit for a composing machine, said machine having a plurality of instrumentalities to be actuated, a tape feeding device, a continuously rotated driving source for operating said feeding device, a first set of permutation bars, a first transfer means controlled by said driving source to selectively set said first set of permutation bars, an intermittently operative driving source, a second set of permutation bars, a second transfer means, means controlled by said continuously operative driving source to control the operation of said intermittently operative driving source to operate said second transfer means to impart to said second set of permutation bars a setting set up in said first set of permutation bars, said second set of permutation bars having double edged code notch accommodations, a plurality of pairs of means, each pair cooperatively associated with respective and oppositely disposed ones of said code notch accommodations, spreader means interposed between said pairs of means to facilitate the cooperation of said pairs of means with said permutation bars, and an operating bar, said pairs of means having engageable facilities, whereby upon a selective response of said pairs of means under the control of said tape feeding device through said first and second transfer means said facilities are brought selectively into engaging relation with said operating bar to actuate an instrumentality while a successive instrumentality is being selected.

10. In a control unit for a composing machine, said machine having a plurality of instrumentalities to be actuated, a tape feeding device, a first means for operating said feeding device, a first set of permutation bars, a first transfer means controlled by said first means to selectively set said first set of permutation bars, a second operating means, a second set of permutation bars, a second transfer means, means controlled by said first means to control the operation of said second operating means to operate said second transfer means to impart to said second set of permutation bars a setting set up in said first set of permutation bars, said second set of permutation bars having double edged code notch accommodations, a plurality of pairs of attrahently biased members having confronting edges cooperable with respective ones of said code notch accommodations, spreader means interposed between the members of said pairs to effectuate the actuation of said members toward and away from said permutation bars, a plurality of interponents each responsively associated with a member, and an operating bar, said interponents having facilities engageable with said operating bar, whereby upon a selective response of said members under the control of said tape feeding device through said first and second transfer means an associated interponent is brought into engaging relation with said operating bar to actuate an instrumentality while a successive instrumentality is being selected.

11. In a control unit for a composing machine, said machine having a plurality of instrumentalities to be actuated, a tape feeding device, a first means for operating said feeding device, a first set of permutation bars, a first transfer means controlled by said first means to selectively set said first set of permutation bars, a second operating means, a second set of permutation bars, a second transfer means, means controlled by said first means to control the operation of said second operating means to operate said second transfer means to impart to said second set of permutation bars a setting set up in said first set of permutation bars, said second set of permutation bars having double edged code notch accommodations, a plurality of sets of means, each set having confronting facilities co-operably associated with respective and oppositely disposed ones of said code notch accommodations, spreader means interposed between said sets of means to facilitate the cooperation of said sets of means with said permutation bars, and an operating bar, said sets of means having engageable facilities, whereby upon a selective response of said sets of means under the control of said tape feeding device through said first and second transfer means said facilities are brought selectively into engaging relation with said operating bar to actuate an instrumentality while a successive instrumentality is being selected.

12. In an automatically controlled composing machine, a plurality of function mechanisms in said machine, a timing means comprising cam operated contacts and electromagnetic control means therefor, one individual to each of said function mechanisms, selecting means in said machine, selectively controlled contacts controlled by said selecting means, and circuits for said timing means controlled by said selectively controlled contacts for controlling the initiation of operation of said timing means according to the function to be performed.

13. A composing machine including a magazine having fixed space matrices and spacebands, a selector mechanism responsive to control indicia appearing in a control strip, elements controlled by said mechanism for controlling the release of fixed space matrices and spacebands, timing means comprising cam operated contacts and electromagnetic control means therefor, circuits for said timing means comprising contacts operated by said selector mechanism, code changing instrumentalities associated with said selector mechanism, means on said timing means for governing said code changing instrumentalities, and universal means cooperable with said selector mechanism to render said timing means effective, whereby the release of fixed space matrices and spacebands is effectuated.

14. A composing machine including a magazine having fixed space matrices and spacebands, a selector mechanism responsive to control indicia appearing in a control strip, elements controlled by said mechanism for controlling the release of fixed space matrices and spacebands, timing means comprising cam operated contacts and electromagnetic control means therefor, circuits for said timing means comprising contacts operated by said selector mechanism, code changing instrumentalities associated with said selector mechanism, sequential control means on said timing means for governing said code changing instrumentalities, and universal means cooperable with said selector mechanism to render said timing means effective, whereby the release of fixed space matrices and spacebands is effectuated sequentially.

15. A composing machine including a magazine having fixed space matrices and spacebands, a selector mechanism responsive to control indicia appearing in a control strip, elements controlled by said mechanism for controlling the release of fixed space matrices and spacebands, adjustable means in said selector mechanism for controlling the alternate operation of said elements, a timing means, means controlled by said selector mechanism for controlling the operation of said timing means, and means in said timing means for governing said adjustable means, whereby the release of fixed space matrices and spacebands is effectuated sequentially.

16. In a control unit, a plurality of function bars to be selected, means for selectively actuating said function bars comprising a set of permutation bars having code notch accommodations, a plurality of selectable members individually selectable in accordance with the positionment of said bars, spring elements for urging said members against said bars, a cam for cyclically withdrawing said members from said bars, a reciprocating actuator bar, a plurality of tailed hook members each responsively associated with a companion selectable member, said hook members having tail portions associated individually with the extremity of a companion selectable member, whereby said actuator bar is adapted to engage the hook portion of a selected hook member, and means carried by certain of said hook members engageable with a function bar in juxtaposition therewith to effectuate the actuation of said function bar.

References Cited in the file of this patent
UNITED STATES PATENTS

| | | |
|---|---|---|
| 1,970,567 | Potts | Aug. 21, 1924 |
| 2,062,306 | Goetz | Dec. 1, 1936 |
| 2,090,654 | Walden | Aug. 24, 1937 |
| 2,091,286 | Krum et al. | Aug. 31, 1937 |
| 2,098,973 | Reiber | Nov. 16, 1937 |
| 2,104,030 | Goetz | Jan. 4, 1938 |
| 2,152,641 | Goetz | Apr. 4, 1939 |